US011983780B2

(12) United States Patent
Dalz et al.

(10) Patent No.: US 11,983,780 B2
(45) Date of Patent: May 14, 2024

(54) SYSTEM AND METHOD OF DETERMINING TAX LIABILITY OF ENTITY

(71) Applicant: ERNST & YOUNG GMBH WIRTSCHAFTSPRÜFUNG-SGESELLSCHAFT, Stuttgart (DE)

(72) Inventors: Reinhard Dalz, Weinheim (DE); Nikola Bubalo, Munich (DE)

(73) Assignee: EY GMBH & CO. KG WIRTSCHAFTSP ÜFUNGSGESELL SCHAFT, Stuttgart (DE)

( * ) Notice: Subject to any disclaimer, the term of this patent is extended or adjusted under 35 U.S.C. 154(b) by 210 days.

(21) Appl. No.: 17/266,105

(22) PCT Filed: Aug. 6, 2019

(86) PCT No.: PCT/IB2019/056675
§ 371 (c)(1),
(2) Date: Feb. 5, 2021

(87) PCT Pub. No.: WO2020/031081
PCT Pub. Date: Feb. 13, 2020

(65) Prior Publication Data
US 2021/0233181 A1 Jul. 29, 2021

(30) Foreign Application Priority Data
Aug. 6, 2018 (EP) .................................... 18020368

(51) Int. Cl.
*G06Q 40/00* (2023.01)
*G06F 40/289* (2020.01)
(Continued)

(52) U.S. Cl.
CPC ........... *G06Q 40/10* (2013.01); *G06F 40/289* (2020.01); *G06N 5/025* (2013.01)

(58) Field of Classification Search
CPC ....... G06Q 40/10; G06F 40/289; G06N 5/025
See application file for complete search history.

(56) References Cited

U.S. PATENT DOCUMENTS 7,693,760 B1 * 4/2010 Fiteni ................... G06Q 40/123
705/30
9,418,385 B1 * 8/2016 Wang .................... G06Q 40/10
(Continued)

FOREIGN PATENT DOCUMENTS

| WO | WO-2017019233 A1 * | 2/2017 | ........... G06Q 40/123 |
| WO | WO-2018098507 A1 * | 5/2018 | ......... G06Q 30/0201 |
| WO | WO-2021083239 A1 * | 5/2021 | ......... G06F 16/9024 |

OTHER PUBLICATIONS

Melz et al., "Modeling the Tax Code," USC Information Sciences Institute (ISI), OTM Workshops 2004, LNCS 3292, pp. 652-661, R. Meersman et al. (editors), 2004 (Year: 2004).*
(Continued)

*Primary Examiner* — Abhishek Vyas
*Assistant Examiner* — William B. Bunker
(74) *Attorney, Agent, or Firm* — Kevin J Fournier Intellectual Property Legal Services Ltd.; Kevin J Fournier

(57) ABSTRACT

Disclosed is system that determines tax liability of entity. The system comprises server arrangement and database arrangement coupled in communication with server arrangement. The server arrangement is configured to: (a) obtain information pertaining to entity; (b) perform natural language processing on the information to generate conceptual representation; (c) determine at least two tax jurisdictions towards which entity has tax liability; (d) access, from database arrangement, knowledge-based information and/or regulation-based information pertaining to tax for at least two tax jurisdictions and analyse the knowledge-based information and/or the regulation-based information to generate
(Continued)

conceptual representation of knowledge-based and/or regulation-based information for at least two tax jurisdictions; and (e) analyse conceptual representation of the information, based upon conceptual representation of knowledge-based and/or regulation-based information, to determine tax liability of entity towards at least two tax jurisdictions, wherein server arrangement, by analysing conceptual representation of the information, reduces errors or inaccuracies present in the information.

23 Claims, 5 Drawing Sheets

(51) Int. Cl.
  *G06N 5/025* (2023.01)
  *G06Q 40/10* (2023.01)

(56) References Cited

U.S. PATENT DOCUMENTS

| | | | | |
|---|---|---|---|---|
| 10,042,836 | B1* | 8/2018 | Wang | G06F 16/9024 |
| 11,295,393 | B1* | 4/2022 | Orphys | G06F 8/313 |
| 2001/0039490 | A1* | 11/2001 | Verbitsky | G06F 16/334 |
| | | | | 707/E17.082 |
| 2004/0019541 | A1* | 1/2004 | William | G06Q 20/207 |
| | | | | 705/31 |
| 2009/0089126 | A1* | 4/2009 | Odubiyi | G06Q 10/06393 |
| | | | | 704/9 |
| 2011/0137705 | A1* | 6/2011 | Srinivasan | G06Q 10/0635 |
| | | | | 705/7.28 |
| 2011/0288972 | A1* | 11/2011 | Brady | G06Q 40/00 |
| | | | | 705/31 |
| 2017/0116187 | A1* | 4/2017 | Erickson | G10L 13/027 |
| 2018/0114275 | A1* | 4/2018 | Wang | G06F 40/205 |
| 2018/0211332 | A1* | 7/2018 | Kraemer | G06Q 40/10 |
| 2019/0065461 | A1* | 2/2019 | Andrews | G06F 40/30 |
| 2020/0159990 | A1* | 5/2020 | Mukherjee | G06Q 10/10 |

OTHER PUBLICATIONS

Gokhale et al., "NAPA C: Compiling for a Hybrid RISC/FPGA Architecture," Proceedings: IEEE Symposium on FPGA's, 1998 (Year: 1998).*

Milner et al., "Tax Analytics—Artificial Intelligence and Machine Learning—Level 5," PwC Price Waterhouse Coopers, Advanced Tax Analytics and Innovation, 2017 (Year: 2017).*

Dorner et al., "Describing Globally Distributed Software Architectures for Tax Compliance," arXiv:2312.00925v2 Mar. 4, 2024 (Year: 2024).*

Li Xiu-hua, "Research on Tax Planning for Location Choice of Cross-Border Merges and Acquisitions," 2010 International Conference on Management Science and Engineering (17th) 2010 (Year: 2010).*

* cited by examiner

SYSTEM AND METHOD OF DETERMINING TAX LIABILITY OF ENTITY

TECHNICAL FIELD

The present disclosure relates generally to hardware systems that are configured to process tasks pertaining to taxation; and more specifically, to configurations of hardware systems that, when operated, determine tax liabilities of entities, such systems comprising computing hardware including server arrangements and database arrangements coupled in communication with the server arrangements, for example wherein the hardware systems are reconfigurable depending on a nature of data being processed therethrough, for example for error correction purposes or for data security purposes (for example, by using data encryption and corresponding decryption adapted for taxation data protection purposes). Furthermore, the present disclosure also relates to methods of using the aforementioned systems for determining tax liabilities of entities. Moreover, the present disclosure also relates to computer program products for determining tax liabilities of entities, the computer program products comprises a non-transitory machine-readable data storage medium having stored thereon program instructions that, when accessed by a processing device, cause the processing device to execute the aforementioned methods.

BACKGROUND

In recent years, many patents have been granted for new computing architectures and configurations, irrespective of a wide variety of tasks to which the new computing architecture and configuration are applied in use. The architectures and configurations provide for more efficient processing of various types of data therein. Similar considerations pertain to various configurations of data encoders and decoders for which patent rights are granted in the Europe and UK, even when such data encoders and decoders are implemented using software on standard known computing architectures, irrespective of the nature of the data that are processed through the data encoders and decoders (i.e. patentability is allowed in UKIPO, EPO and USPTO, irrespective of whether the data is derived from sensors or is abstract data (for example, computer-generated graphics, see GB2533111B, Applicant: Gurulogic Oy; "Encoder, decoder and method for images, video and audio")). Protection of data by employing a reversible change in data entropy of the data is accepted by patent authorities as being a further technical effect, irrespective of a nature of the data.

With rapid advancements in transportation and communication technologies, there is a rapid increase in interaction between entities across the world. As a result of such an era of globalization, there is an exchange of persons, goods and services, and economic resources such as capital, technology and data between different geographical regions. In an example, an individual may relocate to another country for employment, thereby leaving his/her home country. In another example, a multi-national company may be operating in two or more countries. In yet another example, a national company may have multiple regional offices within a single country.

Generally, different geographical regions (such as different countries, different states and the like) correspond to different tax jurisdictions. In such a case, within a given tax jurisdiction, a single tax authority is generally responsible to enforce a given set of tax laws and regulations pertaining to the given tax jurisdiction. Therefore, the tax authority collects taxes from all entities having tax liability towards the given tax jurisdiction. Nowadays, due to globalization, a single entity is often liable to pay taxes towards multiple tax jurisdictions.

Presently, there exist several resources (namely, conventional computing devices) that are employed for determining tax liability of an entity. However, there exist certain limitations associated with such resources. Firstly, the entity often employs services of expert tax professionals, and such expert professionals determine the entity's tax liability manually. In such a case, calculations for determining the entity's tax liability are often very lengthy and cumbersome, thereby leading to frequent occurrence of errors in such calculations. Furthermore, existing knowledge of a given expert tax professional may be limited to only a few tax jurisdictions and tax related cases. As a result, there may be inaccuracies associated with determination of the entity's tax liability towards multiple jurisdictions. Secondly, the entity or the expert professionals engaged by the entity can employ tax related tools (for example, such as tax calculator and the like) for determining the tax liability of the entity. However, such tax related tools also have some issues associated therewith. As an example, the tax related tools are often configured to determine the tax liability of the entity towards a single tax jurisdiction only. As another example, the determined tax liability by way of such tax related tools also needs substantial review from the expert professionals.

Moreover, there currently exist several issues associated with calculating tax liability of a given entity towards multiple tax jurisdictions. As an example, multiple tax authorities have diverse and comprehensive tax laws and regulations. Moreover, sources of information having diverse and comprehensive tax laws and regulations, are disparate and often distributed. Therefore, developing hardware systems and corresponding software products that aggregate and systematically organise tax laws and regulations from such multiple tax authorities poses a significant challenge pertaining to data acquisition, data processing, data protection and data recording. Providing computing hardware that is specifically configured to be able to collate and process tax laws and regulations-related data from disparate and often distributed tax authorities is a technical problem associated with known technical art. Notably, this technical problem also pertains to various other technical domains (for example, such as healthcare, telecommunication, information technology, and the like) wherein information sources are disparate and quantities of information are potentially enormous. Moreover, data provided from the information sources is often of a sensitive nature and susceptible to potential third-party hacking and eavesdropping.

Presently, several analytical methods and conventional computing devices are being used for calculating tax liability of a given entity towards multiple tax jurisdictions. However, the conventional computing devices are not well adapted in their manner of operation to process information associated with tax jurisdictions. Generally, the expert professionals perform the analytical methods manually, based on human judgment; such human judgement is often inaccurate because of human limitations (for example, such as fatigue, outdated knowledge about rules and regulations, and so forth). Moreover, such human judgement often leads to errors and inaccuracies in the calculation of tax liability of the given entity towards multiple tax jurisdictions since such analytical methods are cumbersome and computationally intensive; moreover, stochastic errors can also arise for various technical reasons in data that is provided for being processed pursuant to the analytical methods. Even when a given expert professional employs conventional computing hardware for performing the aforesaid analytical methods, the given expert professional has to expend substantial manual effort for processing diverse items of disparate information.

Therefore, in light of the foregoing discussion, there exists a need to overcome the aforementioned drawbacks associated with determination of tax liability of an entity, and in particular, there exists a need to provide computing systems that are specifically configured for determining tax liability of entity.

SUMMARY

The present disclosure seeks to provide an improved hardware system that, when operated, is more effective when processing diverse types of data, for example when determining a tax liability of an entity. The present disclosure also seeks to provide an improved method of applying the aforesaid improved hardware system when processing diverse types of data, for example when determining a tax liability of an entity. The present disclosure also seeks to provide a computer program product for determining a tax liability of an entity. The present disclosure seeks to provide a solution to the existing problems such as errors and inaccuracies in data to be processed (for example when performing a determination of a tax liability of an entity) on account of human judgemental implementation of cumbersome analytical methods. An aim of the present disclosure is to provide a solution that overcomes at least partially the problems encountered in prior art, and provides an intelligent, easy to use, and reliable system for accurately determining the tax liability of the entity using specially-adapted hardware systems.

In one aspect, an embodiment of the present disclosure provides a system that, when operated, determines a tax liability of an entity, the system comprising a server arrangement and a database arrangement coupled in communication with the server arrangement, wherein the server arrangement is configured to:
 (a) obtain information pertaining to the entity;
 (b) perform natural language processing on the information pertaining to the entity to generate a conceptual representation of the information pertaining to the entity, wherein the natural language processing is to be performed based upon at least one natural language in which the information is available;
 (c) determine at least two tax jurisdictions towards which the entity has the tax liability, based upon the conceptual representation of the information pertaining to the entity, the at least two tax jurisdictions having different tax laws and regulations;
 (d) access, from the database arrangement, knowledge-based information and/or regulation-based information pertaining to tax for the at least two tax jurisdictions, and analyse the knowledge-based information and/or the regulation-based information to generate a conceptual representation of the knowledge-based information and/or the regulation-based information for the at least two tax jurisdictions; and
 (e) analyse the conceptual representation of the information pertaining to the entity, based upon the conceptual representation of the knowledge-based information and/or the regulation-based information for the at least two tax jurisdictions, to determine the tax liability of the entity towards the at least two tax jurisdictions, wherein the server arrangement, by analysing the conceptual representation of the information pertaining to the entity, reduces errors or inaccuracies present in the information pertaining to the entity.

An essential feature "conceptual representation" includes, for example, semantic representation within its scope.

In another aspect, an embodiment of the present disclosure provides a method of determining a tax liability of an entity, the method comprising using a computer system comprising a server arrangement and a database arrangement coupled in communication with the server arrangement, wherein the method comprises using the computer system for:
 (a) obtaining information pertaining to the entity;
 (b) performing natural language processing on the information pertaining to the entity to generate a conceptual representation of the information pertaining to the entity, wherein the natural language processing is performed based upon at least one natural language in which the information is available;
 (c) determining at least two tax jurisdictions towards which the entity has the tax liability, based upon the conceptual representation of the information pertaining to the entity, the at least two tax jurisdictions having different tax laws and regulations;
 (d) accessing, from a data repository, knowledge-based information and/or regulation-based information pertaining to tax for the at least two tax jurisdictions, and analysing the knowledge-based information and/or the regulation-based information to generate a conceptual representation of the knowledge-based information and/or the regulation-based information for the at least two tax jurisdictions; and
 (e) analysing the conceptual representation of the information pertaining to the entity, based upon the conceptual representation of the knowledge-based information and/or the regulation-based information for the at least two tax jurisdictions, to determine the tax liability of the entity towards the at least two tax jurisdictions, wherein the server arrangement, by analysing the conceptual representation of the information pertaining to the entity, reduces errors or inaccuracies present in the information pertaining to the entity.

An essential feature "conceptual representation" includes, for example, semantic representation within its scope.

In yet another aspect, an embodiment of the present disclosure provides a computer program product for determining a tax liability of an entity, the computer program product comprising a non-transitory machine-readable data storage medium having stored thereon program instructions that, when accessed by a processing device, cause the processing device to:
 (a) obtain information pertaining to the entity;
 (b) perform natural language processing on the information pertaining to the entity to generate a conceptual representation of the information pertaining to the entity, wherein the natural language processing is to be performed based upon at least one natural language in which the information is available;
 (c) determine at least two tax jurisdictions towards which the entity has the tax liability, based upon the conceptual representation of the information pertaining to the entity, the at least two tax jurisdictions having different tax laws and regulations;
 (d) access, from a data storage of the processing device, knowledge-based information and/or regulation-based information for the at least two tax jurisdictions, and analyse the knowledge-based information and/or the regulation-based information to generate a conceptual representation of the knowledge-based information and/or the regulation-based information for the at least two tax jurisdictions; and (e) analyse the conceptual representation of the information pertaining to the entity, based upon the conceptual representation of the knowledge-based information and/or the regulation-based information for the at least two tax jurisdictions, to determine the tax liability of the entity towards the at least two tax jurisdictions, wherein the processing device, by analysing the conceptual representation of the information pertaining to the entity, reduces errors or inaccuracies present in the information pertaining to the entity.

An essential feature "conceptual representation" includes, for example, semantic representation within its scope.

The system described herein includes component parts that are specially adapted to determine the tax liability of the entity in a more computationally efficient and accurate manner than hitherto known.

Embodiments of the present disclosure substantially eliminate or at least partially address the aforementioned problems in the prior art, and provides a simple, reliable, accurate, data-secure and effortless system and method for determination of the tax liability of the entity whilst reducing computational burden.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
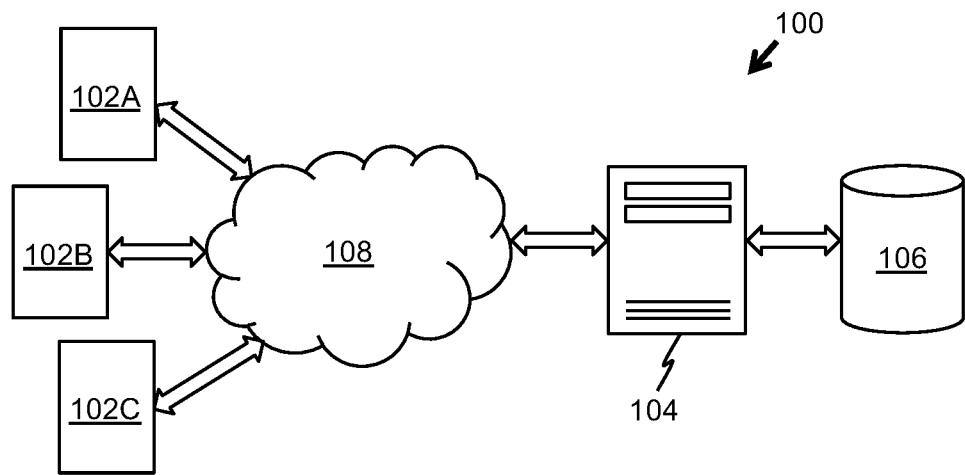
FIG. 1 is a schematic illustration of a network environment including a hardware system that, when operated, determines a tax liability of an entity, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system that, when operated, determines a tax liability of an entity, the system comprising a server arrangement and a database arrangement coupled in communication with the server arrangement, wherein the server arrangement is configured to:

(a) obtain information pertaining to the entity;

(b) perform natural language processing on the information pertaining to the entity to generate a conceptual representation of the information pertaining to the entity, wherein the natural language processing is to be performed based upon at least one natural language in which the information is available;

(c) determine at least two tax jurisdictions towards which the entity has the tax liability, based upon the conceptual representation of the information pertaining to the entity, the at least two tax jurisdictions having different tax laws and regulations;

(d) access, from the database arrangement, knowledge-based information and/or regulation-based information pertaining to tax for the at least two tax jurisdictions, and analyse the knowledge-based information and/or the regulation-based information to generate a conceptual representation of the knowledge-based information and/or the regulation-based information for the at least two tax jurisdictions; and (e) analyse the conceptual representation of the information pertaining to the entity, based upon the conceptual representation of the knowledge-based information and/or the regulation-based information for the at least two tax jurisdictions, to determine the tax liability of the entity towards the at least two tax jurisdictions, wherein the server arrangement, by analysing the conceptual representation of the information pertaining to the entity, reduces errors or inaccuracies present in the information pertaining to the entity.

In another aspect, an embodiment of the present disclosure provides a method of determining a tax liability of an entity, the method comprising using a computer system comprising a server arrangement and a database arrangement coupled in communication with the server arrangement, wherein the method comprises using the computer system for:

(a) obtaining information pertaining to the entity;

(b) performing natural language processing on the information pertaining to the entity to generate a conceptual representation of the information pertaining to the entity, wherein the natural language processing is performed based upon at least one natural language in which the information is available;

(c) determining at least two tax jurisdictions towards which the entity has the tax liability, based upon the conceptual representation of the information pertaining to the entity, the at least two tax jurisdictions having different tax laws and regulations;

(d) accessing, from a data repository, knowledge-based information and/or regulation-based information pertaining to tax for the at least two tax jurisdictions, and analysing the knowledge-based information and/or the regulation-based information to generate a conceptual representation of the knowledge-based information and/or the regulation-based information for the at least two tax jurisdictions; and (e) analysing the conceptual representation of the information pertaining to the entity, based upon the conceptual representation of the knowledge-based information and/or the regulation-based information for the at least two tax jurisdictions, to determine the tax liability of the entity towards the at least two tax jurisdictions, wherein the server arrangement, by analysing the conceptual representation of the information pertaining to the entity, reduces errors or inaccuracies present in the information pertaining to the entity.

In yet another aspect, an embodiment of the present disclosure provides a computer program product for determining a tax liability of an entity, the computer program product comprising a non-transitory machine-readable data storage medium having stored thereon program instructions that, when accessed by a processing device, cause the processing device to:

(a) obtain information pertaining to the entity;

(b) perform natural language processing on the information pertaining to the entity to generate a conceptual representation of the information pertaining to the entity, wherein the natural language processing is to be performed based upon at least one natural language in which the information is available;

(c) determine at least two tax jurisdictions towards which the entity has the tax liability, based upon the conceptual representation of the information pertaining to the entity, the at least two tax jurisdictions having different tax laws and regulations;

(d) access, from a data storage of the processing device, knowledge-based information and/or regulation-based information for the at least two tax jurisdictions, and analyse the knowledge-based information and/or the regulation-based information to generate a conceptual representation of the knowledge-based information and/or the regulation-based information for the at least two tax jurisdictions; and (e) analyse the conceptual representation of the information pertaining to the entity, based upon the conceptual representation of the knowledge-based information and/or the regulation-based information for the at least two tax jurisdictions, to determine the tax liability of the entity towards the at least two tax jurisdictions, wherein the processing device, by analysing the conceptual representation of the information pertaining to the entity, reduces errors or inaccuracies present in the information pertaining to the entity.

The present disclosure provides the aforementioned system, method and computer program product for determining the tax liability of the entity; however, it will be appreciated that the hardware system and method can be reconfigured for handling other types of data than merely financial data for tax purposes, providing an advantage of a reduction in errors or inaccuracies. Beneficially, the method described herein allows for determining the tax liability of the entity, for example for correcting errors and distortions in information acquired from an environment, for example acquired from a manufacturing facility, but not limited thereto. The aforementioned system is intelligent, easy to implement, and allows for accurately determining the tax liability of the entity. Notably, such a system can be operated in a semi-automated manner or fully automated manner, or iterates between the semi-automated manner and the fully automated manner to determine the tax liability of the entity; by such operation, there is achieved a substantially reduced judgement deduction burden on a user. Consequently, the described system allows for reducing manual work pertaining to determination of the tax liability of the entity. As a result, the described system is capable of eliminating inter-individual variations in judgement based on knowledge of expert professionals of various domains, thereby providing a stable and reliable performance of the system. Furthermore, by employing powerful customized processing hardware, the system allows for analysing a much larger volume of relevant data for determining the tax liability of the entity, as compared to a human (such as an expert professional in the field of taxation) and conventional computing devices; for example, the customized processing hardware utilizes a plurality of layers of clusters of variable-state machines, wherein the layers are disposed in a hierarchical manner, and wherein the variable-state machines are able to learn and reason in a manner akin to what occurs in a human cortex by feeding back outputs of the variable-state machines in an adaptable manner between the hierarchical layers. As a result, the determined tax liability of the entity by way of the described system is accurate and reliable. Notably, the system described herein provides customized computing hardware that is specifically configured to be able to collate, process and store tax laws and regulations-related data from disparate and often distributed sources; optionally, the sources are not limited to merely providing financial data, and can provide, for example, measurement data, sensor data providing recording of movement of goods, and so forth. Beneficially, the system and method allow for accurately determining the tax liability of the entity towards the multiple tax jurisdictions, in a simple, quick, and user-friendly manner. Notably, the calculation of tax liability is performed digitally using customized processing hardware, and can therefore be seamlessly integrated into digital solutions that determine the tax liability of the entity. Therefore, by employing the aforesaid system efforts of the given user in calculating tax liability are considerably reduced. For example, for purposes of handling large quantities of data for computing tax liability, the customized processing hardware employs data memory units of mutually different access speeds that are redeployed in operation so that less-frequently accessed data is recorded in relatively slower (less expensive) data memory, and most-frequently accessed data is recorded in relatively faster (more expensive) data memory (for example, solid-state instant-access memory). Moreover, data memory with encryption and decryption interfaces is beneficially optionally used for more sensitive data that has great commercial significance that otherwise could potentially be a target for third-party hackers and eavesdropping. The calculation of tax liability is, for example, implemented in a specialized taxation module that is coupled in communication to the server arrangement, wherein the taxation module includes corresponding software that operates to enable the taxation module to exchange data with the server arrangement. Furthermore, in such an example, the taxation module is implemented using field-programmable gate arrays (FPGA's) or custom-designed digital hardware (for example, implemented using one or more high-speed reduced instruction set (RISC) processors).

It will be appreciated that the aforesaid system, when operated, and the aforesaid method are not limited to determining the tax liability of only a single entity, and can be operated to determine a tax liability of a plurality of entities (namely, multiple entities). In such a case, the aforesaid steps (a) to (e) are implemented for each entity of the plurality of entities.

Optionally, the system is operated autonomously to determine the tax liability of the entity. In such a case, a system administrator associated with the system operates the system in a manner that the aforesaid steps (a) to (e) are entirely implemented at the system.

Alternatively, optionally, the system is operated semi-autonomously to determine the tax liability of the entity. In an embodiment, when the system is operated semi-autonomously, the system administrator associated with the system operates the system in a manner that at least one of the aforesaid steps (a) to (e) are implemented by the system administrator. As an example, the step of obtaining the information pertaining to the entity may be performed manually by the system administrator. Thereafter, the system administrator may input such obtained information pertaining to the entity, into the system. However, it will be appreciated that the information can be derived from sensor systems, for example cameras, scanners, microphones, and the like. Such sensors, for example, generate images of financial transaction records, that are subject to image analysis using artificial intelligence (AI) correlation algorithms to generate transformed data which is then employed in computing tax liability and/or for reducing errors or inaccuracies on other data provided to the module. In another embodiment, when the system is operated semi-autonomously, the system administrator associated with the system verifies (namely, double checks) the tax liability of the entity that is determined by the system.

Optionally, the system administrator is an expert professional having knowledge pertaining to at least one of: finance, accounting, taxation for at least one tax jurisdiction, product quality assurance.

Throughout the present disclosure, the term "server arrangement" refers to an arrangement of at least one server that, when operated, performs the aforementioned steps (a) to (e) to determine the tax liability of the entity. The term "server" generally refers to an application, program, process or device in a client-server relationship that responds to requests for information or services by another application, program, process or device (a client) on a communication network. The term "server" also encompasses software that makes the act of serving information or providing services possible. Moreover, the term "client" generally refers to an application, program, process or device in a client-server relationship that requests information or services from another application, program, process or device (the server) on the communication network. Importantly, the terms "client" and "server" are relative since an application may be a client to one application but a server to another application. The term "client" also encompasses software that makes the connection between a requesting application, program, process or device and a server possible, such as an FTP client. It will be appreciated that the communication network can be an individual network, or a collection of individual networks that are interconnected with each other to function as a single large network. The communication network may be wired, wireless, or a combination thereof. Examples of the individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks. It will be appreciated that the method of the present disclosure is beneficially capable of reconfiguring computing hardware implementing the method, for example in response to calculation of the tax liability implemented by the computing hardware; for example, various data storage modules in computing hardware that store financial data or sensor data can be reconfigured dynamically for varying their speed of access, to make computational tasks more temporally efficient.

Furthermore, throughout the present disclosure, the term "database arrangement" refers to an arrangement of at least one database that when employed, allows for the server arrangement to perform the aforementioned steps (a) to (e) to determine the tax liability of the entity. The term "database" generally refers to hardware, software, firmware, or a combination of these for storing information in an organized (namely, structured) manner, thereby, allowing for easy storage, access (namely, retrieval), updating and analysis of such information. The term "database" also encompasses database servers that provide the aforesaid database services to the server arrangement. It will be appreciated that the data repository is implemented by way of the database arrangement.

For illustration there will now be considered an exemplary network environment, wherein the system that, when operated, determines the tax liability of the entity, is implemented pursuant to embodiments of the present disclosure. One such network environment has been illustrated in conjunction with FIG. 1 as explained in more detail hereinafter. The exemplary network environment may include a plurality of electronic devices (hereinafter referred to as "entity devices") associated with a plurality of entities, the server arrangement including the at least one server, the database arrangement including at least one database, and the communication network. The server arrangement may be coupled in communication with the entity devices via the communication network. In such a case, the entity devices can be understood to be the "clients" for the server arrangement. It is to be noted here that it is not necessary for the server arrangement to be coupled in communication with all the entity devices simultaneously at all times. Furthermore, the server arrangement is coupled in communication with the database arrangement (for example, via the communication network). Examples of the entity devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers and custom sensor arrangement with user-interface.

It will be appreciated that the aforementioned server arrangement can be implemented in several ways. In an example, the at least one server of the server arrangement could be directly coupled in communication with a given entity device associated with a given entity, via the communication network. In such an example, the at least one server could perform the aforementioned steps (a) to (e) for determining a tax liability of the given entity. In another example, the server arrangement could have a distributed architecture wherein the server arrangement could comprise a plurality of servers that are coupled in communication with a given entity device associated with a given entity, via the communication network. In such a case, there can be a first server (namely, a "front-end server") that is directly coupled in communication with the given entity device, and at least one server (namely, at least one "back-end server") that is coupled in communication to the first server. In operation, the first server can be accessed by the given entity using the given entity device, via the communication network. Furthermore, in such a case, the at least one back-end server, either alone, or in combination with the front-end server, could implement the aforesaid steps (a) to (e). In yet another example, server arrangement could be implemented by way of a cloud server arrangement.

Optionally, the system further comprises a taxation module that is coupled in communication with the server arrangement for performing tax liability computations. The taxation module is beneficially implemented using custom computing hardware that is reconfigurable depending on a type of tax liability computations being executed on the taxation module. More optionally, the taxation module is implemented by employing a configuration of field-programmable gate arrays (FPGA's) and reduced instruction set (RISC) computers. Therefore, the taxation module can be understood to be a custom computing hardware that is configured to perform the tax liability computations described throughout the present disclosure. Notably, such a custom computing hardware is computationally efficient, thereby allowing the tax liability computations to be performed at a much faster than conventional computing hardware. Moreover, such a high speed of operation enables more sophisticated error and/or inaccuracy checks (or both) to be performed to improve a quality of data being used in computations in the taxation module. Yet more optionally, the reduced instruction set (RISC) computers are reconfigured in response to a structure of information received thereat to be processed, allocating one or more tax liability computations to a given reduced instruction set (RISC) computer, and by performing correlations by way of information exchange between a plurality of the reduced instruction set (RISC) computers. For example, such RISC computers are beneficially employed for implementing aforesaid clusters of variable-state machines for providing machine-learning artificial-intelligence (AI) functionality.

Throughout the present disclosure, the term "entity" used herein refers to an individual, a group of individuals, an organization, a group of organizations, and the like, that has tax liability (namely, tax obligation) towards the at least two tax jurisdictions. Notably, the entity can be understood to be a legal person that has legal rights and is subject to legal regulations. It will be appreciated that each time the entity undertakes (namely, participates in) a taxable event pertaining to a given tax jurisdiction, the entity is liable to pay tax to a given tax authority associated with the given tax jurisdiction. In other words, the entity incurs tax liability towards the given tax jurisdiction, upon undertaking the taxable event pertaining to the given tax jurisdiction. Examples of taxable events include, but are not limited to, receipt of income, receipt of interest on savings, and capital gains by selling of assets.

The term "tax jurisdiction" generally refers to a geographical region (for example, such as a country, a state, a city, a municipality, and the like) that is subject to a set of tax laws and regulations. For a given tax jurisdiction, a single tax authority is generally responsible to administer a given set of tax laws and regulations pertaining to the given tax jurisdiction, and collect taxes from all entities having tax liability towards the given tax jurisdiction. As an example, Her Majesty's Revenue and Customs department is the tax authority associated with United Kingdom tax jurisdiction.

Optionally, the entity is an individual. In other words, the entity can be understood to be a natural person (namely, an individual human being) that has legal rights and is subject to legal regulations. Optionally, the individual is an expatriate (namely, an individual residing in a country other than his/her native country). In such a case, since the expatriate's native country and current country of residence would be different tax jurisdictions, the expatriate would have a tax liability towards his/her native country as well as his/her current country of residence. As an example, an individual who is a native of country 'A', and is working for a company 'C' located in the country 'A', may be temporarily transferred by the company 'C' to another country 'B' on a work assignment. In such an example, the individual may have a tax liability towards both the country 'A' and the country 'B'. Optionally, the individual is a person residing in his/her native country. In such a case, the person could undertake taxable events pertaining to the at least two tax jurisdictions within his/her native country, thereby, incurring a tax liability towards the at least two tax jurisdictions. As an example, a person (namely, an individual) who is a native of a country 'D' may undertake taxable events in two states 'D1' and 'D2' of the country 'D', the two states 'D1' and 'D2' being distinct tax jurisdictions. In such an example, the person may have a tax liability towards both the state 'D1' and the state 'D2'. Optionally, the individual is a business traveller (namely, an individual who travels between multiple countries for business purposes). In such a case, the business traveller could be self-employed (namely, managing his/her own business), or could be employed by a business owner.

Alternatively, optionally, the entity is a company. In an embodiment, the company is a multi-national corporation (namely, a company that operates in multiple countries). As an example, a multi-national corporation 'M' may provide goods and/or services via its offices 'M1', 'M2' and 'M3' in three countries 'C1', 'C2' and 'C3' respectively. In such an example, the three countries 'C1', 'C2' and 'C3' relate to three tax jurisdictions having different tax laws and regulations. Therefore, the multi-national corporation 'M' may have a tax liability towards each of the three countries 'C1', 'C2' and 'C3'. In another embodiment, the company is a national corporation (namely, an enterprise that operates in multiple regions of a given country). As an example, a national corporation 'N' may provide goods and/or services via its offices 'N1' and 'N2' in two regions 'R1' and 'R2' respectively, of a given country 'R'. In such an example, the two regions 'R1' and 'R2' relate to two tax jurisdictions having different tax laws and regulations. Therefore, the national corporation 'N' may have a tax liability towards both the regions 'R1' and 'R2'.

It is to be understood that the company may also be referred to as an "organization", a "firm", an "enterprise", an "establishment", an "agency" or an "institution".

Yet alternatively, optionally, the entity is a group of individuals (for example, such as a family).

Still alternatively, optionally, the entity is a group of companies. It is to be understood that the group of companies may also be referred to as a "conglomerate", a "consortium", or a "syndicate".

At (a), the server arrangement obtains the information pertaining to the entity. In an embodiment, the information pertaining to the entity is obtained directly by the server arrangement from an entity device associated with the entity.

In such a case, the entity inputs the information pertaining thereto, at the entity device associated therewith. Thereafter, the server arrangement obtains the information pertaining to the entity, from the entity device, via the communication network. In another embodiment, the information pertaining to the entity is obtained indirectly by the server arrangement. In such a case, the system administrator manually obtains the information pertaining to the entity, from the entity, and inputs the information pertaining to the entity into the server arrangement.

Optionally, the information pertaining to the entity is obtained by the server arrangement, via at least one artificial intelligence algorithm. Such a manner of obtaining the information pertaining to the entity can be used for both the aforesaid direct and indirect ways of obtaining the information pertaining to the entity.

Optionally, the information pertaining to the entity is obtained by the server arrangement by employing blockchain technology. In such a case, the information pertaining to the entity can be stored as a blockchain at the entity device associated with the entity, and can be obtained by the server arrangement either directly, or indirectly.

Optionally, the information pertaining to the entity comprises at least one of: financial information pertaining to the entity, administrative information pertaining to the entity, legal information pertaining to the entity, personal information pertaining to the entity. The term "financial information pertaining to the entity" refers to monetary (namely, money-related) information associated with the entity. Notably, examples of the financial information pertaining to the entity include, but are not limited to, income earned by the entity, wages paid by the entity, value of assets purchased and/or sold by the entity, value of assets hired and/or rented out by the entity, expenses incurred by the entity, and donations made by the entity. Therefore, the financial information pertaining to the entity includes substantial detail regarding finances of the entity, which potentially serves as a starting point for determining the tax liability of the entity. Furthermore, the term "administrative information pertaining to the entity" refers to organizational (namely, managerial) information associated with the entity. Examples of the administrative information pertaining to the entity include, but are not limited to, a number of offices (namely, branches or departments) of the entity, locations of the offices of the entity, organizational structure of the entity, merger and/or acquisitions-related information (for example, such as transactions related to sales and/or purchase of various assets) of the entity, transfer pricing information pertaining to the entity, customs-related information, supply chain taxes, a designation of the entity, reporting offices of the entity, a job description of the entity. Moreover, the term "legal information pertaining to the entity" refers to judicial (namely, related to law) information associated with the entity. Notably, examples of the legal information pertaining to the entity include, but are not limited to, ongoing legal cases involving the entity, decided legal cases involving the entity, laws that the entity is subject to, and legal regulations that the entity is subject to. Furthermore, the term "personal information pertaining to the entity" refers to private information associated with the entity. Examples of personal information pertaining to the entity include, but are not limited to, age of the entity, marital status of the entity, nationality of the entity, identification of the entity, date of incorporation of the entity, board of directors of the entity, and headquarters of the entity.

It will be appreciated that the term "information pertaining to the entity" encompasses all relevant information pertaining to the entity that can be utilised by the system for determining the tax liability of the entity.

Notably, the hardware system can efficiently obtain the information pertaining to the entity from distributed sources. As a result, if the user were to obtain the information pertaining to the entity from such sources manually, it would be very difficult and would require substantial manual effort, with a risk of human errors or inaccuracies to corrupt data. It will be appreciated that said system is specifically configured to be able to collate, process and store the obtained information pertaining to the entity in a meaningful, time-efficient manner.

Optionally, the information pertaining to the entity is in form of at least one of: scanned handwritten data (for example, such as scanned handwritten receipts), scanned digitally written data (for example, such as employment contract of an individual entity, organizational structure of a company entity), scanned machine-readable data (for example, such as digitally filled investment declarations), encoded data, audio data, image data (for example, such as an image of an expense receipt), audio-visual data, digital data (for example, such as machine-readable salary slips), simulation data, transaction data, blockchains.

At (b), the server arrangement performs natural language processing on the information pertaining to the entity to generate the conceptual (for example, semantic, but optionally not limited thereto) representation of the information pertaining to the entity, wherein the natural language processing is performed based upon at least one natural language in which the information is available. It will be appreciated that the information pertaining to the entity is generally in form of the at least one natural language of humans, and therefore, may require processing for the server arrangement to truly understand such information, and subsequently analyse such information whilst determining the tax liability of the entity. Therefore, the server arrangement, when operated, performs natural language processing on the information to generate the conceptual representation of the financial information. In an example, the server arrangement may employ at least one artificial intelligence algorithm to perform natural language processing on the information to generate the semantic representation of the financial information.

Throughout the present disclosure, the term "conceptual representation" refers to a logical representation of a given data that accurately depicts semantic (namely, logical and meaningful) information of the given data in a simple manner. In other words, the conceptual representation of the given data can be understood to be an abstract language detailing data element associated with the given data, and interrelationships between such data elements. The conceptual representation of the given data may employ symbols, alphabets, numbers, and the like, to describe the semantic information of the given data by way of semantic sentences. Typically, the conceptual representation of the given data is in a machine-understandable format, and can easily be processed by the server arrangement. Therefore, the conceptual representation of the information pertaining to the entity relates to a logical representation of all obtained information pertaining to the entity, as described hereinabove. It will be appreciated that the conceptual representation may also be referred to as a "semantic representation".

Optionally, the natural language processing on the information pertaining to the entity is performed by way at least one of: optical character recognition of the information, machine translation of the information, topic segmentation of the information, word sense disambiguation of the information, lemmatization of the information, parsing of the information, word segmentation of the information, morphological segmentation of the information, analysing lexical semantics of the information, speech recognition of the information, speech segmentation of the information, summarization of the information.

Examples of the at least one natural language include, but are not limited to, English, German, French, Spanish, Japanese, Chinese, Hindi, Arabic, Russian and Korean.

It will be appreciated that if such natural language processing were to be performed manually, by the user, for the obtained information pertaining to the entity, the user would spend considerable amount of time and effort. Moreover, such manual processing would be prone to errors and inaccuracies.

At (c), the server arrangement determines the at least two tax jurisdictions towards which the entity has the tax liability, based upon the conceptual representation of the information pertaining to the entity, the at least two tax jurisdictions having different tax laws and regulations. Optionally, the server arrangement is configured to extract, from the conceptual representation of the information pertaining to the entity, the at least two tax jurisdictions having different tax laws and regulations. In such a case, the server arrangement is configured to extract a plurality of geographical regions that are related to the entity, based upon the conceptual representation of the information pertaining to the entity. It will be appreciated that a given geographical region could be related to a given entity as the entity's place of birth, place of citizenship, place of employment, place of establishment, place of manufacture, place of providing goods and/or services, and the like.

In an exemplary scenario, the conceptual representation of the information pertaining to the entity may describe the entity to be related to a first geographical region, a second geographical region, a third geographical region and a fourth geographical region. In a first case, in such an exemplary scenario, the first, second, third and fourth geographical regions may be four distinct tax jurisdictions having different tax laws and regulations. Therefore, the server arrangement may determine the entity to have tax liability towards all of the aforesaid four tax jurisdictions. In a second case, in such an exemplary scenario, the first and second geographical regions may be covered under a single tax jurisdiction, whereas the third and fourth geographical regions may be two distinct tax jurisdictions having different tax laws and regulations. Therefore, the server arrangement may determine the entity to have tax liability towards three tax jurisdictions, namely, the single tax jurisdiction (that covers the first and second geographical regions), a tax jurisdiction pertaining to the third geographical region, and a tax jurisdiction pertaining to the fourth geographical region.

At (d), the server arrangement accesses, from the database arrangement, the knowledge-based information and/or the regulation-based information pertaining to tax for the at least two tax jurisdictions, and analyses the knowledge-based information and/or the regulation-based information to generate the conceptual representation of the knowledge-based information and/or the regulation-based information for the at least two tax jurisdictions. Throughout the present disclosure, the term "knowledge-based information" refers to historical information and/or information obtained from expert professionals in a given field of knowledge (for example, such as tax). Therefore, the knowledge-based information pertaining to tax relates to available world knowledge (such as historical information and/or information obtained from expert professionals) in the field of tax.

Furthermore, throughout the present disclosure, the term "regulation-based information" refers to legal and regulation-related information pertaining to a given field of knowledge (for example, such as tax). Therefore, the regulation-based information pertaining to tax relates to legal and regulation-related information pertaining to the field of tax. It will be appreciated that the knowledge-based information and/or the regulation-based information pertaining to tax for the at least two tax jurisdictions constitutes comprehensive information pertaining to taxation within the at least two tax jurisdictions towards which the entity has the tax liability. Therefore, it will be appreciated that such knowledge-based information and/or such regulation-based information pertaining to tax for the at least two tax jurisdictions is vital for determining the tax liability of the entity towards the at last two tax jurisdictions.

Notably, the knowledge-based information and/or the regulation-based information is to be accessed from disparate and distributed sources. It will be appreciated that the server arrangement is configured to process the knowledge-based information and/or the regulation-based information in order to aggregate and systematically organise the knowledge-based information and/or the regulation-based information from such sources. Conversely, if the user were to perform said step manually, he/she would require substantial manual effort for obtaining such diverse information from disparate and distributed sources. This often leads to errors and inaccuracies in the calculation of tax liability of the entity.

It will be appreciated that the conceptual representation of the knowledge-based information and/or the regulation-based information relates to logical and semantic representation of all accessed knowledge-based information and/or regulation-based information, as described hereinabove.

Optionally, the server arrangement is configured to process the conceptual representation of the knowledge-based information and/or the regulation-based information for the at least two tax jurisdictions, to generate an ontological model for the at least two tax jurisdictions. Throughout the present disclosure, the term "ontological model" refers to a representation of elements (for example, such as entities, concepts, information, and so forth) pertaining to a given field of knowledge (namely, a given subject or a given domain) that describes the elements and interrelationships between the elements. In other words, the ontological model relates to an ontology (for example, in graphical form) of the given field of knowledge that comprehensively describes the given field of knowledge in a logical, simple manner. Therefore, an ontological model for a given tax jurisdiction may depict knowledge-based information and/or regulation-based information pertaining to tax for the given tax jurisdiction as nodes, and interrelationships between such knowledge-based information and/or such regulation-based information as lines and/or arrows between the nodes. Optionally, in such an ontological model, each of the nodes may have at least one attribute and/or value associated therewith. In an example, an ontological model 'OM' for a given tax jurisdiction 'X' may include a first node depicting a tax return form 'F', a second node may depict income tax slabs pertaining to the given tax jurisdiction 'X', and a third node may depict a last date for filing an income tax return within the given tax jurisdiction 'X'. In such a case, an interrelationship between the first node and the second node may describe that the tax return form 'F' is to be filled according to the income tax slabs, and an interrelationship between the first node and the third node may describe that the tax return form 'F' should be filed by the last date for filing the income tax return.

Optionally, the ontological model for the at least two tax jurisdictions comprises ontological knowledge models for the at least two tax jurisdictions and ontological regulation models for the at least two tax jurisdictions. It will be appreciated that an ontological knowledge model for a given tax jurisdiction is a representation of an ontology of existing knowledge-based information for the given tax jurisdiction. Similarly, an ontological regulation model for the given tax jurisdiction is a representation of an ontology of existing regulation-based information for the given tax jurisdiction. Optionally, the ontological knowledge model for the given tax jurisdiction is generated by the server arrangement, and is stored at the database arrangement. Similarly, optionally, the ontological regulation model for the given tax jurisdiction is generated by the server arrangement, and is stored at the database arrangement.

Optionally, the knowledge-based information for a given tax jurisdiction is based upon tax data specific to the given tax jurisdiction, the tax data specific to the given tax jurisdiction comprising at least one of: historical tax reports of different entities in the given tax jurisdiction, tax reports by expert professionals for the given tax jurisdiction, tax-related advisory articles by expert professionals for the given tax jurisdiction, questionnaires filled by expert professionals for the given tax jurisdiction. It will be appreciated that the tax data specific to the given tax jurisdiction includes substantial information (for example, such as best practices, sample tax declarations, previously-filed tax returns, and the like) pertaining to taxation within the given tax jurisdiction, that can be utilized for determining the tax liability of the entity. As an example, a given historical tax report of a given entity in the given tax jurisdiction may include substantial detail regarding tax liability of the given entity towards the given tax jurisdiction, tax-saving investments made by the given entity, a method of paying tax employed by the given entity, and so forth. As another example, a given tax-related advisory article by an expert professional for the given tax jurisdiction may include information detailing various tax-saving investment options pertaining to the given tax jurisdiction, a tax calendar pertaining to the given tax jurisdiction, contact details of expert professionals (namely, tax practitioners) having knowledge of taxation within the given tax jurisdiction, and so forth. As yet another example, a given questionnaire filled by an expert professional for the given tax jurisdiction may illustrate a proper manner in which a given entity should provide the information pertaining thereto, for determining a tax liability of the given entity towards the given tax jurisdiction.

It will be appreciated that the knowledge-based information for the given tax jurisdiction is based on an enormous amount of tax data specific to the given tax jurisdiction. The system of the present disclosure is configured to access the enormous amount of the knowledge-based information and systematically store the obtained knowledge-based information in a concrete and useful form at the data repository. The obtained knowledge-based information is analysed by the system, when in operation, to generate the conceptual representation of the knowledge-based information for the at least two tax jurisdictions in a user-friendly manner. The system is thus capable of performing a large volume of tasks that the user would not be able to do mentally, even if the user were to employ a large team of human assistants.

Optionally, the regulation-based information for a given tax jurisdiction is based upon regulation data specific to the given tax jurisdiction, the regulation data specific to the given tax jurisdiction comprising at least one of: tax regulations imposed in the given tax jurisdiction, tax legislation in the given tax jurisdiction, details of tax-related cases decided by a court or any other competent authority in the given tax jurisdiction. It will be appreciated that the regulation data specific to the given tax jurisdiction includes substantial-legal and regulation-related information pertaining to taxation within the given tax jurisdiction, that can be utilized for determining the tax liability of the entity. Generally, the regulation data specific to the given tax jurisdiction pertains to interpretation and/or administration of tax laws and regulations of the given tax jurisdiction. As an example, a given tax regulation imposed in the given tax jurisdiction may be a procedural tax regulation imposed in the given tax jurisdiction that pertains to when and how an individual entity should file an income tax return. As another example, a given tax legislation in the given tax jurisdiction may pertain to inheritance tax laws of the given tax jurisdiction. As yet another example, details of a given tax-related case decided by a given court in the given tax jurisdiction may describe in detail a correct manner in which tax liability of a given company towards the given tax jurisdiction is to be calculated.

It will be appreciated that the regulation-based information for the given tax jurisdiction is based on an enormous amount of regulation data specific to the given tax jurisdiction. The regulation-based information is analysed by the system, when in operation, to generate the conceptual representation of the regulation-based information for the at least two tax jurisdictions in a user-friendly manner. The user would not be able to do such processing mentally, in view of a huge volume of data to be processed.

At (e), the server arrangement analyses the conceptual representation, for example including a semantic representation, of the information pertaining to the entity, based upon the conceptual representation of the knowledge-based information and/or the regulation-based information for the at least two tax jurisdictions, to determine the tax liability of the entity towards the at least two tax jurisdictions. Notably, the conceptual representation of the information pertaining to the entity is analysed with respect to knowledge-based information and/or regulation-based information pertaining to tax for the at least two tax jurisdictions (described in the conceptual representation of the knowledge-based information and/or the regulation-based information for the at least two tax jurisdictions), to determine the tax liability of the entity towards the at least two tax jurisdictions. As a result, the determined tax liability of the entity towards the at least two tax jurisdictions is accurate.

The server arrangement, by analysing the conceptual representation of the information pertaining to the entity, reduces the errors or inaccuracies present in the information pertaining to the entity. Notably, the customized processing hardware (namely, the taxation module) allows for comprehensive data processing and visualization of the obtained information pertaining to the entity, which aids the user to utilize the system efficiently. Such a customized processing hardware possesses advanced data processing capabilities to facilitate reduction of the errors or inaccuracies present in the information pertaining to the entity by identifying anomalies within such information.

Optionally, at the step (e), the server arrangement is configured to employ at least one artificial intelligence algorithm to analyse the conceptual representation of the information pertaining to the entity, based upon the conceptual representation of the knowledge-based information and/or the regulation-based information for the at least two tax jurisdictions. As a result, upon employing the at least one artificial intelligence algorithms, the system determines the tax liability of the entity towards the at least two tax jurisdictions. Such artificial intelligence algorithms are well known in the art. Examples of the at least one artificial intelligence algorithm include, but are not limited to, a machine learning algorithm, a deep learning algorithm, an artificial neural networks training algorithm.

It will be appreciated that the aforesaid system and the aforesaid method are not limited to determining the tax liability of the entity and can be employed for data acquisition, recording and processing in various domains (for example, such as healthcare, telecommunication, information technology, automobile industry, pharmacy industry, food industry, and so forth) for a plurality of use cases, for example for achieving a reduction of errors and/or inaccuracies (or both) in measurement data derived from retailing environments, manufacturing environments. Examples of the plurality of use cases include, but are not limited to, determining the tax liability for an individual residing within is his/her native country (namely, a non-expat), an individual residing in a country other than his/her native country (namely, an expatriate), an individual who is business traveller, a freelancer working for multi-national corporations, a couple that do not belong to same native country (namely, an expat couple), and a non-profit organisation. In such a case, the aforesaid steps (a) to (e) are implemented for each use case of the plurality of use cases, namely for achieving a reduction on data errors and/or data inaccuracies; such reduction in data errors corresponds to a reduction in entropy of information content of data being processed by the hardware system. It will be appreciated that many encoders and decoders that are protected by granted patent rights in USA and Europe have, as a technical effect, an entropy of data that is processed therethrough, in a reversible manner when decrypting encrypted data, even when the data being processed is often of an abstract nature. Protecting data for security purposes is regarded as being a further technical effect.

Notably, the conceptual representation of knowledge-based information and/or the regulation-based information is explicitly encoded in a machine readable format. Such explicit encoding enables logical inferencing of the information of a higher level of complexity, without any need to explicitly (such as, manually) encode higher level rules. This enables the representations to be able to use in a plurality of use cases in various domains, for example while also maintaining an anonymity of the data representing the knowledge-based information for data security reasons. Examples of the various domains may include, but are not limited to tax consultancies (for example, as tax recommendation systems based on national and/or international rules and regulations), healthcare sectors (for example, for diagnosis purposes), legal sectors (for example, criminal law procedures), pharmacy and/or chemical industries (for example, for toxicity prediction of new compounds). In an example, the conceptual representation of knowledge-based information and/or the regulation-based information may be partially explicitly encoded. Moreover, the hardware system of the present disclosure allows for implementing specially adapted hardware system in a reliable manner with high efficiency and accuracy, whilst reducing intensive calculation burden on the user to determine tax liability of the entity. Beneficially, the system is able to update diverse database information and provide a quasi-static computing environment for performing complex computations in a stable and verifiable manner. Whereas, if the user determines the tax liability of the entity manually, based on judgment, this often leads to errors and inaccuracies in the tax liability computations; it will be appreciated that such manual processing is cumbersome and calculation intensive, wherein embodiments of the present disclosure provide a solution to such a calculation burden.

For illustration purposes only, there will now be considered an example wherein the aforesaid system is operated, and the entity is a given individual. In the illustrated example, a conceptual representation of the information pertaining to the given individual may describe taxable income of the given individual in two tax jurisdictions 31 and 32 to be USD 100,000 and GBP 150,000 respectively. In such a case, tax liability of the given individual towards the tax jurisdictions 31 and 32 can be determined by analysing the aforesaid conceptual representation of the information pertaining to the given individual in tax jurisdictions 31 and 32, based upon a conceptual representation of the knowledge-based information and/or regulation-based information for the tax jurisdictions 31 and 32. Notably, the conceptual representation of the knowledge-based information and/or regulation-based information for the tax jurisdictions 31 and 32 describes knowledge-based information and/or regulation-based information pertaining to tax for the tax jurisdictions 31 and 32. In such an example, upon the aforesaid analysis, a tax liability of the given individual towards the tax jurisdiction 31 may be determined to be USD 20,000 whereas the tax liability of the given individual towards the tax jurisdiction 32 may be determined to be GBP 21,500.

Optionally, a determined tax liability of the entity towards at least one of the at least two tax jurisdictions is zero. In other words, the entity could have zero (namely, nil) tax liability towards at least one of the at least two tax jurisdictions.

Optionally, the server arrangement is configured to collect knowledge-based information and/or regulation-based information pertaining to tax for a plurality of tax jurisdictions, and to store the knowledge-based information and/or the regulation-based information pertaining to tax for the plurality of tax jurisdictions at the database arrangement. In such a case, the server arrangement collects the knowledge-based information and/or the regulation-based information pertaining to tax for the plurality of tax jurisdictions from database(s) of tax authorities of the plurality of tax jurisdictions, web servers, an administrator device associated with the system administrator, and the like. Examples of the administrator device include, but are not limited to, a smartphone, a desktop computer, a laptop computer, and a tablet computer. Notably, the collected knowledge-based information and/or the collected regulation-based information pertaining to tax for the plurality of tax jurisdictions constitutes an information bank (namely, a collection of information) that comprises substantial taxation-related information pertaining to the plurality of tax jurisdictions. Therefore, it will be appreciated that greater the number of tax jurisdictions for which knowledge-based information and/or regulation-based information is collected, more comprehensive (namely, more detailed or enriched) is the information bank. As a result, the system described hereinabove could be operated to determine any entity's tax liability towards multiple jurisdictions easily and accurately.

Optionally, the knowledge-based information and/or the regulation-based information pertaining to tax for the plurality of tax jurisdictions is/are collected upon payment of a fee. Alternatively, optionally, the knowledge-based information and/or the regulation-based information pertaining to tax for the plurality of tax jurisdictions is/are collected for free, without payment of any fee.

Optionally, the knowledge-based information and/or the regulation-based information pertaining to tax for the plurality of tax jurisdictions is/are collected upon initializing the system, and thereafter, updated intermittently. In such a case, the system administrator associated with the system could operate the system intermittently (for example, as per requirement or his/her discretion), thereby allowing for the server arrangement to collect latest knowledge-based information and/or the regulation-based information pertaining to tax for the plurality of tax jurisdictions. Alternatively, optionally, the knowledge-based information and/or the regulation-based information pertaining to tax for the plurality of tax jurisdictions is/are collected automatically by the server arrangement and thereafter, updated periodically. In such a case, the knowledge-based information and/or the regulation-based information pertaining to tax for the plurality of tax jurisdictions stored at the database arrangement are always up-to-date (namely, updated).

It will be appreciated that the server arrangement is configured to access up-to-date knowledge-based information and/or regulation-based information pertaining to tax for the plurality of tax jurisdictions to accurately determine the tax liability of the entity towards the at least two tax jurisdictions. This considerably reduces the user's effort in determining the tax liability. For example, the up-to-date knowledge-based information and/or regulation-based information is stored in encrypted form in a blockchain, wherein embodiments of the present disclosure, for example via use of smart contracts, is able to access the blockchain to obtain data and other information therefrom. It will be appreciated that blockchain technology is susceptible to being protected by patent rights in Europe, for example as disclosed in granted European patent EP3257191B1, by virtue of smart contracts and blockchain blocks being verifiable using hash or related encryption technologies.

Optionally, at the database arrangement, the knowledge-based information and/or the regulation-based information pertaining to tax for the plurality of tax jurisdictions are to be stored by employing blockchain technology. The term "blockchain" used herein relates to an interlinked set of blocks of information that is implemented as distributed digital ledgers. Generally, a given blockchain cannot be modified easily. Therefore, at the database arrangement, the knowledge-based information and/or the regulation-based information pertaining to tax for the plurality of tax jurisdictions are stored as blockchains. Optionally, upon modification and/or addition in the stored knowledge-based information and/or the stored regulation-based information pertaining to tax for the plurality of tax jurisdictions, all copies of blockchains corresponding thereto are updated at exactly the same time, thereby ensuring that the information bank stays up-to-date. Notably, by employing such blockchain technology, the system is able to store the knowledge-based information and/or the regulation-based information pertaining to tax for the plurality of tax jurisdictions in structured and meaningful manner. Therefore, the server arrangement is configured to generate the conceptual representation of the knowledge-based information and/or regulation-base information for the at least two tax jurisdictions in a user-friendly manner. Moreover, optionally, the knowledge-based information and/or the regulation-based information pertaining to tax for the plurality of tax jurisdictions is encrypted. This allows for protection of the information from any kind of unwanted manipulation.

Optionally, when collecting the knowledge-based information for the given tax jurisdiction, the server arrangement is configured to:
  perform natural language processing on the tax data specific to the given tax jurisdiction and generate a conceptual representation of the tax data, wherein the natural language processing is to be performed based upon at least one natural language in which the tax data is available; and
  integrate the conceptual representation of the tax data into a conceptual representation of the knowledge-based information for the given tax jurisdiction.

It will be appreciated that the tax data specific to the given tax jurisdiction is generally in form of the at least one natural language of humans, and therefore, may require processing for the server arrangement to truly understand such tax data, and subsequently utilise such tax data whilst determining the tax liability of the entity. Therefore, the server arrangement, when operated, performs natural language processing on the tax data specific to the given tax jurisdiction to generate the conceptual representation of the tax data. Consequently, the conceptual representation of the tax data, that relates to a logical and semantic representation of all the tax data specific to the given tax jurisdiction, can be integrated into the conceptual representation of the knowledge-based information for the given tax jurisdiction by the server arrangement, to collect comprehensive knowledge-based information pertaining to tax for the given tax jurisdiction.

Optionally, the tax data specific to the given tax jurisdiction is in form of at least one of: scanned handwritten data, scanned digitally written data, scanned machine-readable data, encoded data, audio data, image data, audio-visual data, digital data (for example, such as machine-readable text), machine-understandable data. It will be appreciated that when the tax data is in form of the machine-understandable data, the aforesaid natural language processing operation may be omitted.

Optionally, the natural language processing on the tax data specific to the given tax jurisdiction is performed by way at least one of: optical character recognition of the tax data, machine translation of the tax data, topic segmentation of the tax data, word sense disambiguation of the tax data, lemmatization of the tax data, parsing of the tax data, word segmentation of the tax data, morphological segmentation of the tax data, analysing lexical semantics of the tax data, speech recognition of the tax data, speech segmentation of the tax data, summarization of the tax data.

Optionally, the natural language processing on the tax data specific to the given tax jurisdiction may be performed by employing at least one artificial intelligence algorithm.

Optionally, the server arrangement is configured to process the conceptual representation of the knowledge-based information for the given tax jurisdiction, to generate the ontological knowledge model for the given tax jurisdiction.

Optionally, when collecting the regulation-based information for the given tax jurisdiction, the server arrangement is configured to:
  perform natural language processing on the regulation data specific to the given tax jurisdiction and generate a conceptual representation of the regulation data, wherein the natural language processing is to be performed based upon at least one natural language in which the regulation data is available; and integrate the conceptual representation of the regulation data into a conceptual representation of the regulation-based information for the given tax jurisdiction.

It will be appreciated that the regulation data specific to the given tax jurisdiction is generally in form of the at least one natural language of humans, and therefore, may require processing for the server arrangement to truly understand such regulation data, and subsequently utilise such regulation data whilst determining the tax liability of the entity. Therefore, the server arrangement, when operated, performs natural language processing on the regulation data specific to the given tax jurisdiction to generate the conceptual representation of the regulation data. Consequently, the conceptual representation of the regulation data, that relates to a logical and semantic representation of all the regulation data specific to the given tax jurisdiction, can be integrated into the conceptual representation of the regulation-based information for the given tax jurisdiction by the server arrangement, to collect comprehensive regulation-based information pertaining to tax for the given tax jurisdiction.

Optionally, the regulation data specific to the given tax jurisdiction is in form of at least one of: scanned handwritten data, scanned digitally written data, scanned machine-readable data, encoded data, audio data, image data, audio-visual data, digital data (for example, such as machine-readable text), machine-understandable data. It will be appreciated that when the regulation data is in form of the machine-understandable data, the aforesaid natural language processing operation may be omitted.

Optionally, the natural language processing on the regulation data specific to the given tax jurisdiction is performed by way at least one of: optical character recognition of the regulation data, machine translation of the regulation data, topic segmentation of the regulation data, word sense disambiguation of the regulation data, lemmatization of the regulation data, parsing of the regulation data, word segmentation of the regulation data, morphological segmentation of the regulation data, analysing lexical semantics of the regulation data, speech recognition of the regulation data, speech segmentation of the regulation data, summarization of the regulation data.

Optionally, the natural language processing on the regulation data specific to the given tax jurisdiction may be performed by employing at least one artificial intelligence algorithm.

Optionally, the server arrangement is configured to process the conceptual representation of the regulation-based information for the given tax jurisdiction, to generate the ontological regulation model for the given tax jurisdiction.

Optionally, the server arrangement is configured to provide the entity or a representative of the entity with a questionnaire to clarify any inconsistencies identified during or after the analysis of the conceptual representation of the information pertaining to the entity at (e). Beneficially, such operation of the server arrangement allows for clarifying any inconsistencies that may have occurred due to discrepancies in the obtained information pertaining to the entity, errors during natural language processing on the information pertaining to the entity, incorrect determination of the at least two tax jurisdictions towards which the entity has the tax liability, and so forth. In such a case, the server arrangement transmits the questionnaire to a given entity device that is associated with the entity or the representative of the entity, via the communication network. Thereafter, the entity or the representative of the entity fills the questionnaire, and transmits the filled questionnaire to the server arrangement, via the communication network. Optionally, the entity or the representative of the entity fills at least a portion of the information obtained at (a), in the questionnaire. Notably, the entity or the representative of the entity could fill the questionnaire completely, or partially.

It will be appreciated that the questionnaire efficiently clarifies misstatements and inconsistencies for simplifying the process of accurately determining the tax liability of the entity. In other words, the taxation module facilitates distortion (namely, misstatements) correction by identifying anomalies within the obtained information pertaining to the entity. Notably, the information pertaining to the entity having large anomalies associated therewith, can introduce a significant bias into the aforesaid tax liability analysis. Optionally, in such a case, the information that exceeds a given threshold, or plurality of thresholds defining a range, the system notifies that additional input is required to reduce the inconsistencies and therefore reduce stochastic variation in computations performed by the system; by such an approach, errors or distortions can be reduced.

Optionally, the server arrangement is configured to:
  employ at least one audio signal to provide the entity or the representative of the entity with an audio questionnaire to clarify any inconsistencies identified during or after the analysis of the conceptual representation of the information pertaining to the entity at (e), and
  receive a response to the audio questionnaire, from the entity or the representative of the entity.

In such a case, the audio questionnaire may be provided to the entity or the representative of the entity in a form of at least one speech signal. Furthermore, in such a case, the entity or the representative of the entity may provide the response via at least one of: speech input, text input, image input, video input, multimedia input. In operation, the server arrangement may employ at least one artificial intelligence algorithm to provide the entity or a representative of the entity with the aforementioned audio questionnaire. Furthermore, the server arrangement may employ at least one artificial intelligence algorithm to process the received response to the audio questionnaire, thereby allowing clarification of any inconsistencies identified during or after the analysis of the conceptual representation of the information pertaining to the entity at (e). Optionally, the filled questionnaire is in a machine-readable form. In such a case, the filled questionnaire can be easily processed by the server arrangement to clarify, and subsequently correct, any inconsistencies identified during or after the analysis of the conceptual representation of the information pertaining to the entity at (e). Alternatively, optionally, the server arrangement is configured to perform natural language processing on the filled questionnaire to obtain a machine-readable form of the filled questionnaire.

Optionally, upon determining the tax liability of the entity towards the at least two tax jurisdictions, the server arrangement is configured to communicate to the entity, the determined tax liability of the entity. In an embodiment, the server arrangement is configured to send an email to the entity for communicating the determined tax liability of the entity towards the at least two tax jurisdictions. In another embodiment, the server arrangement is configured to send a text, an audio, or a multimedia message to the entity for communicating the determined tax liability of the entity towards the at least two tax jurisdictions. In yet another embodiment, the server arrangement is configured to render the determined tax liability of the entity towards the at least two tax jurisdictions at a user interface of the entity device associated with the entity.

Optionally, the server arrangement is configured to create a tax report of the entity for at least one of the at least two tax jurisdictions. Optionally, in this regard, a given tax report of the entity for a given tax jurisdiction comprises at least one of: the determined tax liability of the entity towards the given tax jurisdiction, at least a portion of the obtained information pertaining to the entity, a list or a summary of acceptable methods of paying tax to the tax authority of the given tax jurisdiction, proposals for saving the tax that is to be paid by the entity according to the determined tax liability of the entity, a timeline pertaining to payment of the tax to the tax authority of the given tax jurisdiction.

Optionally, the tax report is in form of at least one of: encrypted text, unencrypted text, image, audio, audio-video.

It will be appreciated that the system is configured to obtain an enormous amount of information pertaining to the entity and systematically represent the obtained information pertaining to the entity to the user via interactive user interface in a concrete and useful form; the system thereby has considerable practical utility. The conceptual representation of the information pertaining to the entity is analysed, based upon the conceptual representation of the knowledge-based information and/or the regulation-based information for the at least two tax jurisdictions, to determine the tax liability of the entity towards the at least two tax jurisdictions. The generated tax report, based upon the determined tax liability of the entity, is represented to the user in a user-friendly manner. This allows the user to easily understand and draw logical inferences associated with the tax liability calculations, which he/she would not be able to do mentally.

Optionally, the server arrangement is configured to provide the entity with at least one tax saving option pertaining to at least one of the at least two tax jurisdictions towards which the tax liability of the entity is determined. More optionally, the server arrangement is configured to predict an amount of tax that can be saved upon selection of the at least one tax saving option. In operation, the server arrangement may employ at least one artificial intelligence algorithm to provide the entity or a representative of the entity with the aforementioned questionnaire in a form of the speech signal. In operation, the server arrangement may employ at least one artificial intelligence algorithm to make the aforesaid prediction.

Optionally, the server arrangement is configured to enable the entity to pay tax to the at least two tax authorities of the at least two tax jurisdictions, wherein an amount of the tax to be paid by the entity is based upon the determined tax liability of the entity towards the at least two tax jurisdictions. In such a scenario, the entity could pay tax to a given tax authority, via a single transaction or multiple transactions. Notably, the server arrangement could employ various techniques that allow for the entity to pay the tax to the at least two tax authorities of the at least two tax jurisdictions. In an embodiment, the server arrangement is configured to facilitate the payment of the tax to the at least two tax authorities of the at least two tax jurisdictions via at least one of: an Internet banking transaction, a debit card transaction, a credit card transaction, a digital wallet transaction. In another embodiment, the server arrangement is configured to facilitate the payment of the tax to the at least two tax authorities of the at least two tax jurisdictions via a cryptocurrency transaction, the cryptocurrency transaction employing blockchain technology. It will be appreciated that the blockchain technology allows for easy, quick and secure transactions.

Furthermore, optionally, upon successful payment of the tax to the at least two tax authorities, the server arrangement is configured to provide at least one tax payment confirmation to the entity. In an embodiment, the server arrangement provides a single tax payment confirmation to the entity, the single tax payment confirmation acknowledging the payment of the tax to all tax authorities of the at least two tax authorities. In another embodiment, the server arrangement provides separate tax payment confirmations to the entity acknowledging the payment of the tax to separate tax authorities of the at least two tax authorities. In an example, a given tax payment confirmation may be provided as a notification that is to be displayed on the entity device associated with the entity. In another example, a given tax payment confirmation may be provided as a downloadable receipt that is generated by the at least two tax authorities. In another example, a given tax payment confirmation may be provided as a downloadable receipt that is generated by the server arrangement. In still another example, a given tax payment confirmation may be provided as an email, a text message, and/or a multimedia message.

Optionally in this regard, historical information related to the determined tax liability of the entity towards the given tax jurisdiction is employed for the simulation of the tax liability of the entity towards the given tax jurisdiction for the given time period. Furthermore, optionally, the obtained information pertaining to the entity is employed for the simulation of the tax liability of the entity towards the given tax jurisdiction for the given time period. It will be appreciated that such a predictive simulation allows for the entity to implement appropriate financial planning actions (such as investments, insurance, donations, and the like). As an example, the aforesaid simulation of the tax liability of the entity towards the given tax jurisdiction for the given time period, may be performed in an event of imminent merger of the entity with another entity, an acquisition of another entity by the entity, import of goods by the entity into the given tax jurisdiction, establishment of operational centres of the entity in the given tax jurisdiction, and the like.

Optionally, the system employs blockchain technology to manage the operations of the server arrangement and the database arrangement, as described hereinabove. In other words, the information pertaining to the aforesaid steps (a) to (e) describing operations of the server arrangement and the database arrangement, are stored in form of blockchains, thereby ensuring security and convenient authorized accessibility of such information. Therefore, it will be appreciated that the aforesaid information is stored to maintain an "audit log" pertaining to the determination of the tax liability of the entity. Beneficially, such an audit log facilitates the system to comply with regulatory requirements in documentation, which may be specified by tax authorities.

The present disclosure also relates to the method as described above. Various embodiments and variants disclosed above apply mutatis mutandis to the method.

Optionally, the method further comprises collecting the knowledge-based information and/or the regulation-based information pertaining to tax for the plurality of tax jurisdictions, and storing the knowledge-based information and/or the regulation-based information pertaining to tax for the plurality of tax jurisdictions at the data repository.

Optionally, in the method, the knowledge-based information for a given tax jurisdiction is based upon tax data specific to the given tax jurisdiction, the tax data specific to the given tax jurisdiction comprising at least one of: historical tax reports of different entities in the given tax jurisdiction, tax reports by expert professionals for the given tax jurisdiction, tax-related advisory articles by expert professionals for the given tax jurisdiction, questionnaires filled by expert professionals for the given tax jurisdiction.

Optionally, the step of collecting the knowledge-based information for the given tax jurisdiction comprises:
   performing natural language processing on the tax data specific to the given tax jurisdiction and generating the conceptual representation of the tax data, the natural language processing being performed based upon at least one natural language in which the tax data is available; and
   integrating the conceptual representation of the tax data into the conceptual representation of the knowledge-based information for the given tax jurisdiction.

Optionally, in the method, the regulation-based information for a given tax jurisdiction is based upon regulation data specific to the given tax jurisdiction, the regulation data specific to the given tax jurisdiction comprising at least one of: tax regulations imposed in the given tax jurisdiction, tax legislation in the given tax jurisdiction, details of tax-related cases decided by a court or any other competent authority in the given tax jurisdiction.

Optionally, the step of collecting the regulation-based information for the given tax jurisdiction comprises:
   performing natural language processing on the regulation data specific to the given tax jurisdiction and generating the conceptual representation of the regulation data, the natural language processing being performed based upon at least one natural language in which the regulation data is available; and
   integrating the conceptual representation of the regulation data into the conceptual representation of the regulation-based information for the given tax jurisdiction.

Optionally, the method further comprises providing the entity or a representative of the entity with the questionnaire to clarify any inconsistencies identified during or after the analysis of the conceptual representation of the information pertaining to the entity at the step (e).

Optionally, in the method, the entity is the individual. Alternatively, optionally, in the method, the entity is the company.

Optionally, the method further comprises creating the tax report of the entity for at least one of the at least two tax jurisdictions.

Optionally, the method further comprises enabling the entity to pay tax to at least two tax authorities of the at least two tax jurisdictions, wherein an amount of the tax to be paid by the entity is based upon the determined tax liability of the entity towards the at least two tax jurisdictions.

DETAILED DESCRIPTION OF THE DRAWINGS

Referring to FIG. 1, illustrated is a schematic illustration of a network environment 100 including a hardware system that, when operated, determines a tax liability of an entity, in accordance with an embodiment of the present disclosure; optionally, the hardware system is custom-configured hardware that is capable of performing artificial intelligence (AI) functionalities, as well as stochastic error reduction and data protection by way of encryption and corresponding decryption. As shown, the network environment 100 includes a plurality of entity devices (depicted as entity devices 102A, 102B and 102C), a server arrangement 104, a database arrangement 106, and a communication network 108. The plurality of entity devices 102A-C are associated with a plurality of entities. In an example, a given entity can be an individual. In another example, a given entity can be a company. It is to be understood that the system, when operated, is not limited to determining the tax liability of only a single entity, and can be operated to determine a tax liability of the plurality of entities. Notably, the system comprises the server arrangement 104 and the database arrangement 106 coupled in communication with the server arrangement 104. As shown, the server arrangement 104 is coupled in communication with the plurality of entity devices 102A-C via the communication network 108. It will be appreciated that for sake of simplicity and clarity, the server arrangement 104 and the database arrangement 106 are shown to include a single server and a single database respectively. However, the server arrangement 104 and the database arrangement 106 can also include a plurality of servers and a plurality of databases, respectively.

It will be appreciated that FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of entity devices, servers, databases, and communication networks. A person skilled in the art will recognize many variations, alternatives, and modifications of embodiments of the present disclosure.

Figure 2A:
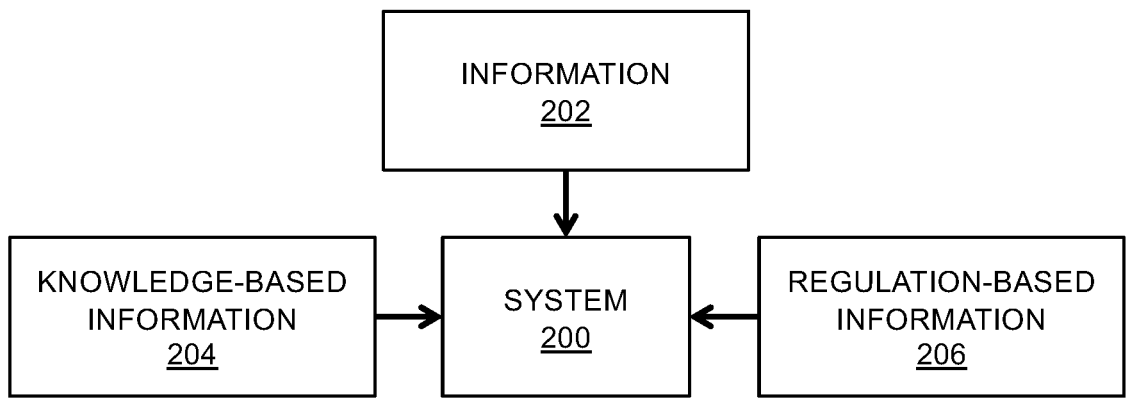
FIGS. 2A, 2B and 2C are illustrations of inputs received by a hardware system that, when operated, determines a tax liability of an entity, in accordance with various embodiments of the present disclosure.
Figure 2B:
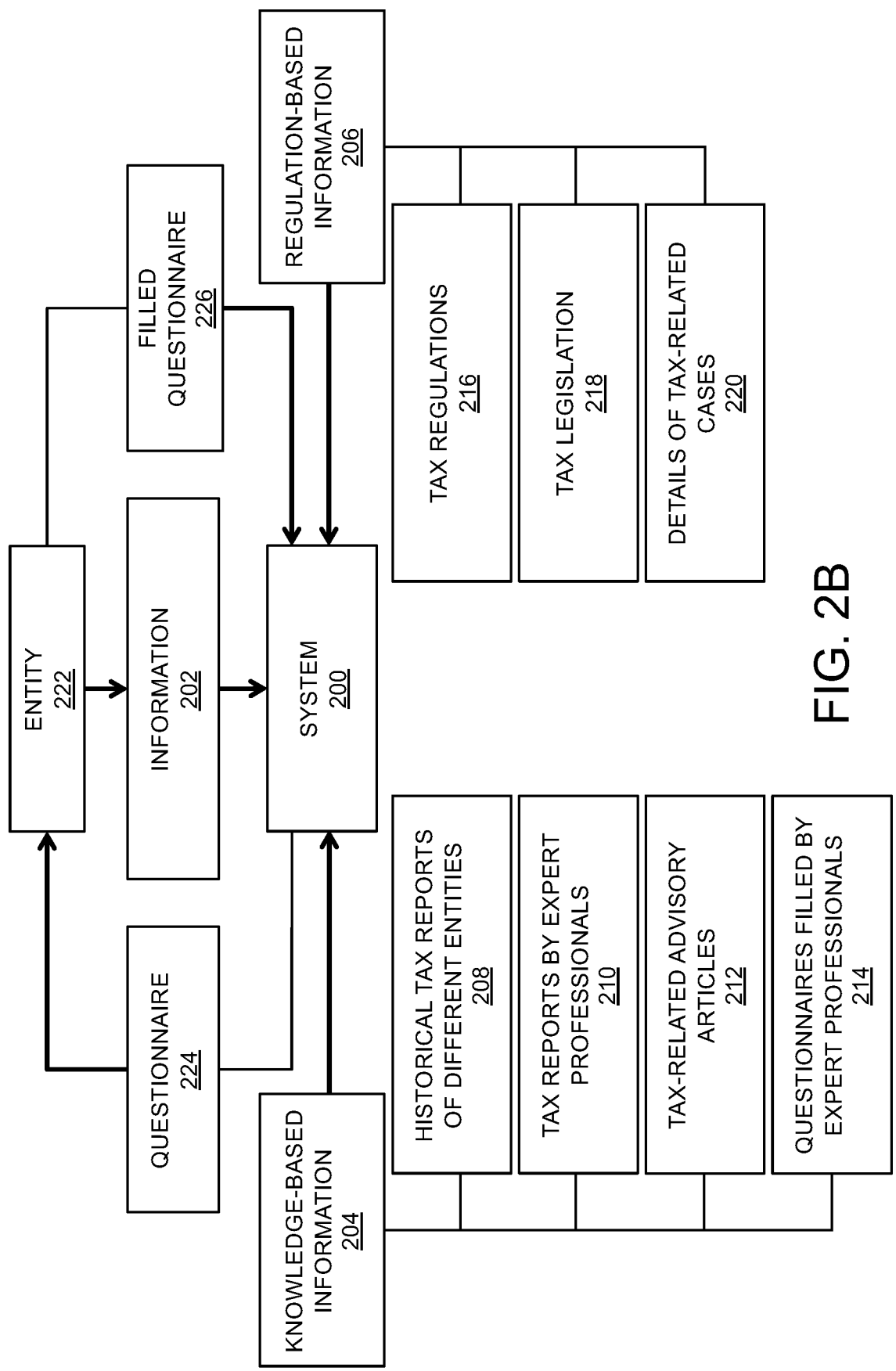
Figure 2C:
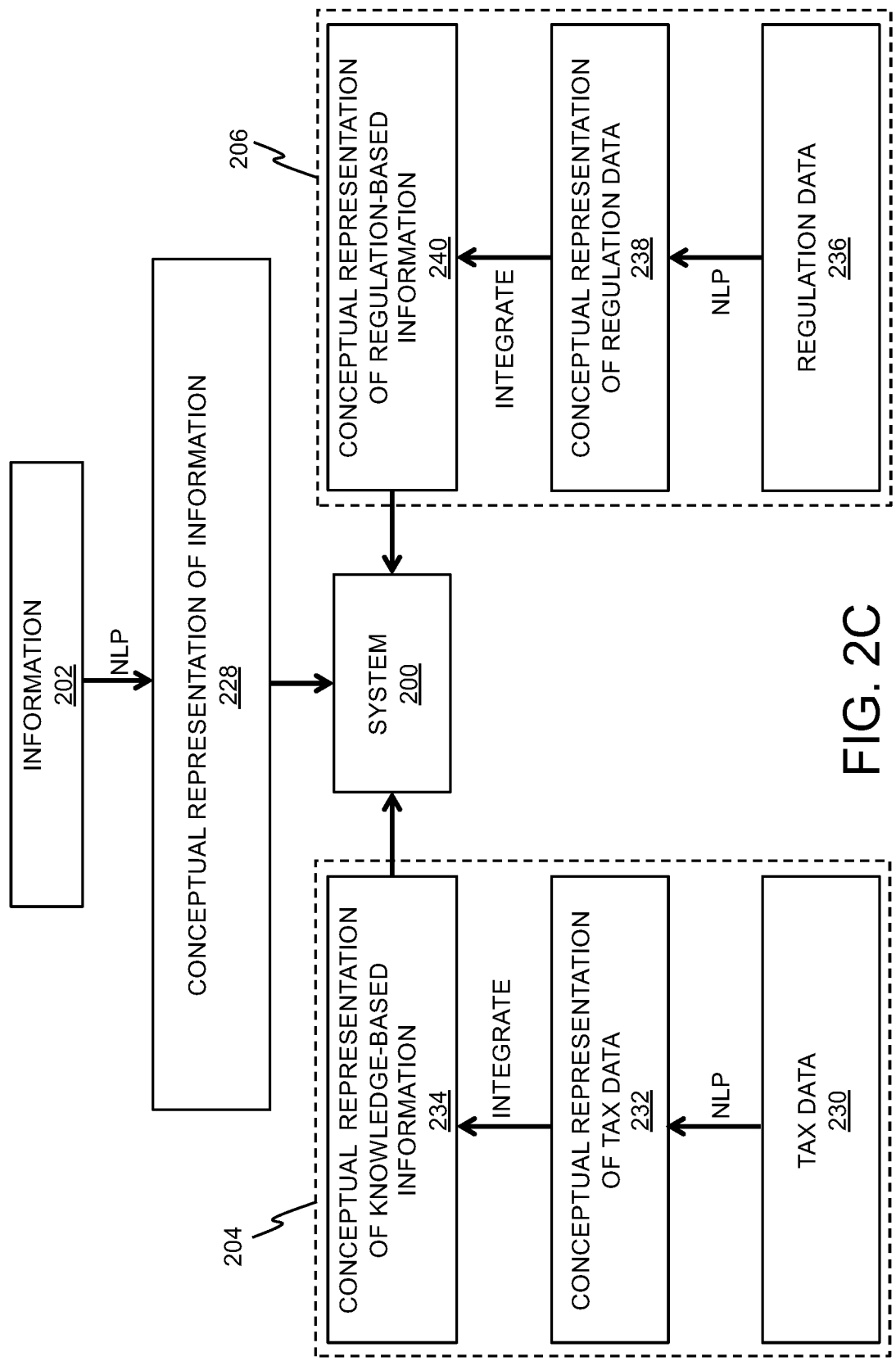

Referring to FIGS. 2A, 2B and 2C, illustrated are inputs received by a hardware system 200 that, when operated, determines a tax liability of an entity, in accordance with various embodiments of the present disclosure. It may be understood by a person skilled in the art that the FIGS. 2A, 2B and 2C include simplified illustration of the inputs received by the system 200 for sake of clarity only, which should not unduly limit the scope of the claims herein. The person skilled in the art will recognize many variations, alternatives, and modifications of embodiments of the present disclosure.

The system 200 of FIGS. 2A, 2B and 2C comprises a server arrangement (not shown) and a database arrangement (not shown) coupled in communication with the server arrangement. Notably, the inputs received by the system 200 comprise: (i) information 202 pertaining to the entity, and (ii) knowledge-based information 204 and regulation-based information 206 pertaining to tax for at least two tax jurisdictions. In operation, the server arrangement obtains the information 202 pertaining to the entity, and performs natural language processing (NLP) on the information 202 pertaining to the entity to generate a conceptual representation (for example, a semantic representation) of the information 202 pertaining to the entity, based upon at least one natural language in which the information 202 is available. Furthermore, the server arrangement accesses the knowledge-based information 204 and regulation-based information 206 pertaining to tax for at least two tax jurisdictions, from the database arrangement.

As shown in FIG. 2B, the knowledge-based information 204 for a given tax jurisdiction is based upon tax data specific to the given tax jurisdiction, the tax data specific to the given tax jurisdiction comprising at least one of: historical tax reports 208 of different entities in the given tax jurisdiction, tax reports 210 by expert professionals for the given tax jurisdiction, tax-related advisory articles 212 by expert professionals for the given tax jurisdiction, questionnaires 214 filled by expert professionals for the given tax jurisdiction. The regulation-based information 206 for a given tax jurisdiction is based upon regulation data specific to the given tax jurisdiction, the regulation data specific to the given tax jurisdiction comprising at least one of: tax regulations 216 imposed in the given tax jurisdiction, tax legislation 218 in the given tax jurisdiction, details of tax-related cases 220 decided by a court or any other competent authority in the given tax jurisdiction. Furthermore, the server arrangement is configured to provide the entity or a representative of the entity, depicted as an entity 222, with a questionnaire 224 to clarify any inconsistencies identified during or after analysis of conceptual representation of the information 202 pertaining to the entity 222. The entity 222 fills the questionnaire 224, and transmits a filled questionnaire 226 to the server arrangement. Therefore, the filled questionnaire 226 also acts as an input to the system 200, in addition to the information 202 pertaining to the entity, the knowledge-based information 204, and the regulation-based information 206 pertaining to tax for the at least two tax jurisdictions.

In FIG. 2C, the inputs received by the system 200 are illustrated along with steps of processing employed to obtain the inputs. As shown, when the information 202 pertaining to the entity is obtained, the server arrangement is configured to perform natural language processing (NLP) on the information 202 pertaining to the entity to generate a conceptual representation 228 of the information 202 pertaining to the entity, wherein the natural language processing is to be performed based upon at least one natural language in which the information 202 is available. Furthermore, when the knowledge-based information 204 for a given tax jurisdiction is collected, the server arrangement is configured to: perform natural language processing on the tax data 230 specific to the given tax jurisdiction and generate a conceptual representation 232 of the tax data 230, wherein the natural language processing is to be performed based upon at least one natural language in which the tax data 230 is available; and integrate the conceptual representation 232 of the tax data 230 into a conceptual representation of the knowledge-based information (for example, such as an ontological knowledge model) 234 for the given tax jurisdiction. Moreover, when the regulation-based information 206 for a given tax jurisdiction is collected, the server arrangement is configured to: perform natural language processing on the regulation data 236 specific to the given tax jurisdiction and generate a conceptual representation 238 of the regulation data 236, wherein the natural language processing is to be performed based upon at least one natural language in which the regulation data 236 is available; and integrate the conceptual representation 238 of the regulation data 236 into a conceptual representation of the regulation-based information (for example, such as an ontological regulation model) 240 for the given tax jurisdiction.

Figure 3:
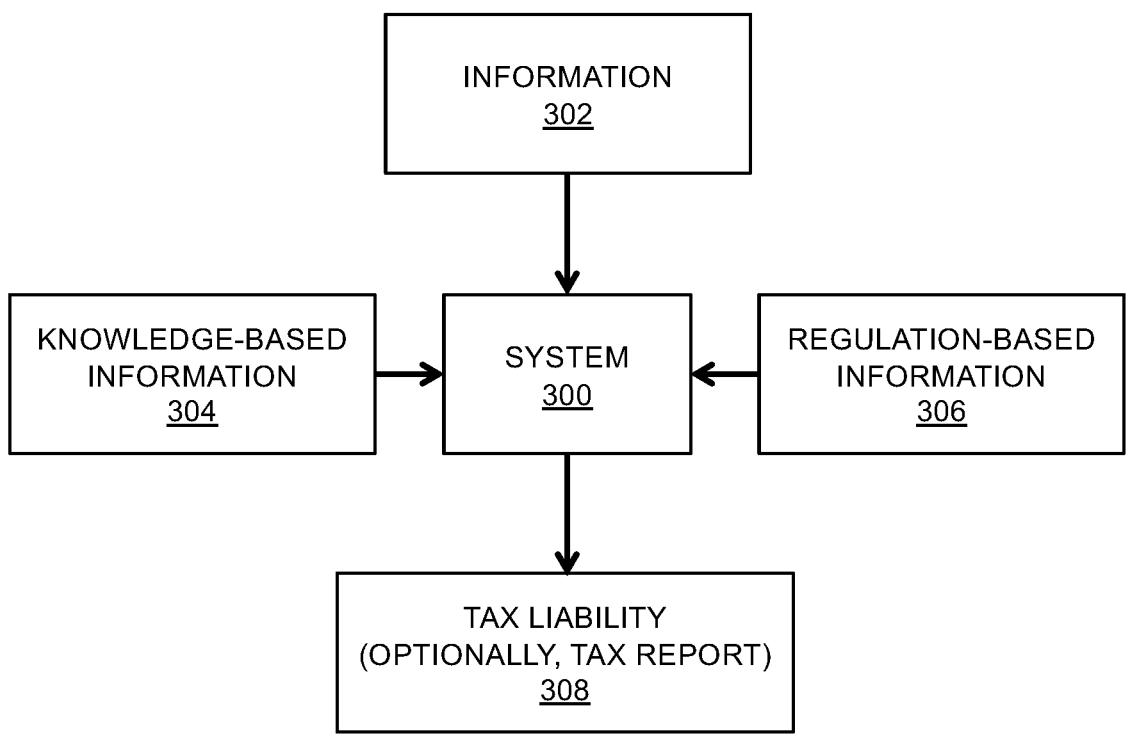
FIG. 3 is a simplified illustration of inputs received and output generated by a hardware system that, when operated, determines a tax liability of an entity, in accordance with an embodiment of the present disclosure.

Referring to FIG. 3, illustrated is a simplified illustration of inputs received and output generated by a hardware system 300 that, when operated, determines a tax liability of an entity, in accordance with an embodiment of the present disclosure. The system 300 comprises a server arrangement (not shown) and a database arrangement (not shown) coupled in communication with the server arrangement, wherein the server arrangement is configured to: (a) obtain information 302 pertaining to the entity; (b) perform natural language processing on the information 302 pertaining to the entity to generate a conceptual representation of the information 302 pertaining to the entity, wherein the natural language processing is to be performed based upon at least one natural language in which the information 302 is available; (c) determine at least two tax jurisdictions towards which the entity has the tax liability, based upon the conceptual representation of the information 302 pertaining to the entity, the at least two tax jurisdictions having different tax laws and regulations; (d) access, from the database arrangement, knowledge-based information 304 and/or regulation-based information 306 pertaining to tax for the at least two tax jurisdictions, and analyse the knowledge-based information 304 and/or the regulation-based information 306 to generate a conceptual representation of the knowledge-based information and/or the regulation-based information for the at least two tax jurisdictions; (e) analyse the conceptual representation of the information 302 pertaining to the entity, based upon the conceptual representation of the knowledge-based information and/or the regulation-based information for the at least two tax jurisdictions, to determine the tax liability 308 of the entity towards the at least two tax jurisdictions. Furthermore, the server arrangement is optionally configured to create a tax report of the entity for at least one of the at least two tax jurisdictions.

Figure 4:
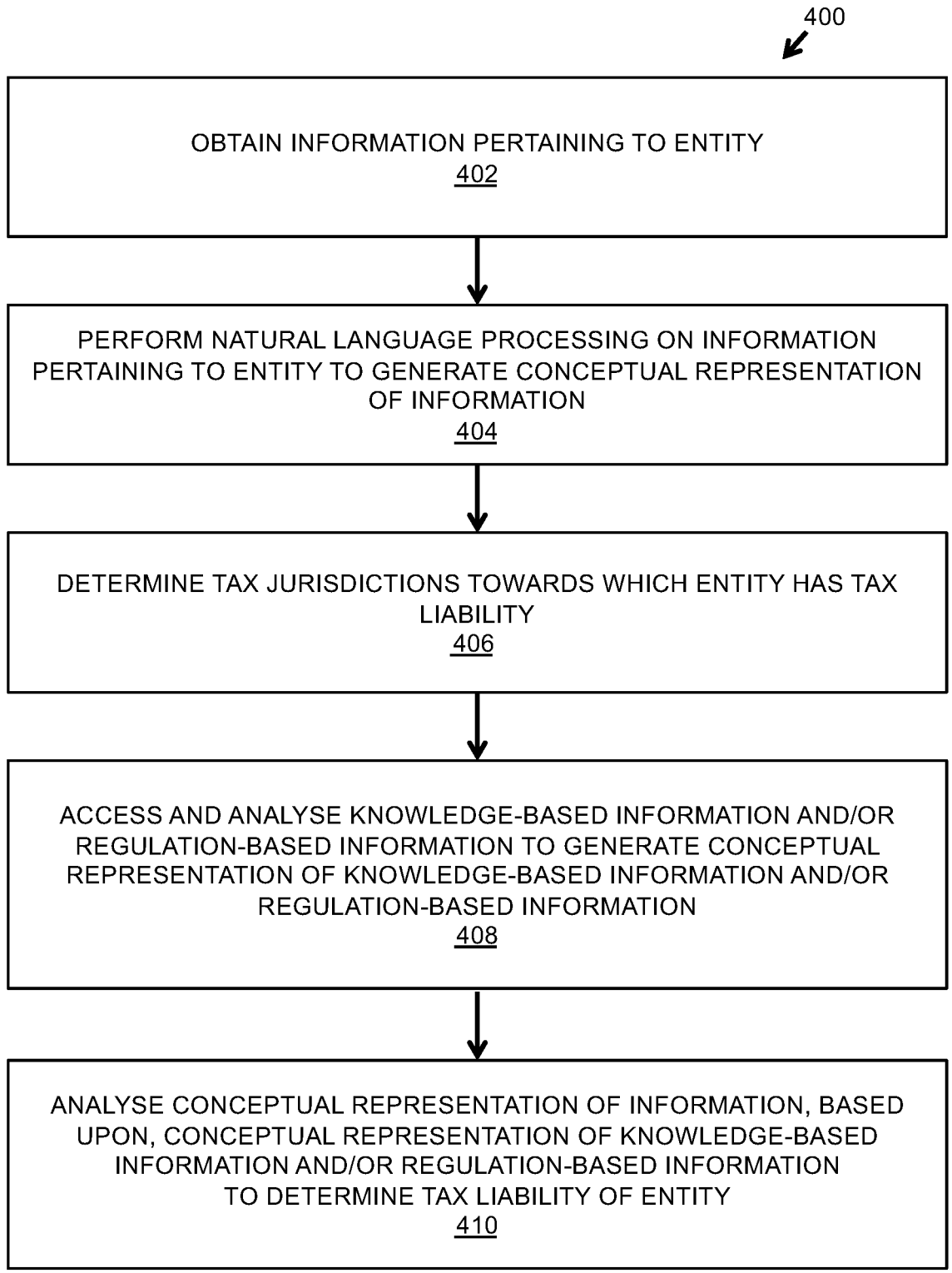
FIG. 4 is an illustration of steps of a method of determining a tax liability of an entity, in accordance with an embodiment of the present disclosure.

Referring to FIG. 4, illustrated are steps of a method 400 of determining a tax liability of an entity, in accordance with an embodiment of the present disclosure. At step 402, information pertaining to the entity is obtained. At step 404, natural language processing is performed on the information pertaining to the entity to generate a conceptual representation of the information pertaining to the entity, wherein the natural language processing is performed based upon at least one natural language in which the information is available. At step 406, at least two tax jurisdictions towards which the entity has the tax liability are determined based upon the conceptual representation of the information pertaining to the entity, the at least two tax jurisdictions having different tax laws and regulations. At step 408, knowledge-based information and/or regulation-based information pertaining to tax for the at least two tax jurisdictions is accessed from a data repository, and the knowledge-based information and/or the regulation-based information are analysed to generate a conceptual representation of the knowledge-based information and/or the regulation-based information for the at least two tax jurisdictions. At step 410, the conceptual representation of the information pertaining to the entity is analysed based upon the conceptual representation of the knowledge-based information and/or the regulation-based information for the at least two tax jurisdictions to determine the tax liability of the entity towards the at least two tax jurisdictions. The errors or inaccuracies present in the information pertaining to the entity are reduced by analysing the conceptual representation of the information pertaining to the entity.

The steps 402 to 410 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system that, when operated, determines a tax liability of an entity, the system comprising a server arrangement and a database arrangement coupled in electronic communication with the server arrangement, wherein the server arrangement comprises a computing device in communication with a plurality of mobile client computing devices associated with the entity, each of the mobile client computing devices having an interface for user entry of information pertaining to the entity, wherein the database arrangement comprises a plurality of memory units of mutually different access speeds, wherein the server arrangement is configured to:

(a) receive, from at least one of the mobile client computing devices, a substantially large amount of information pertaining to the entity, wherein the entity has tax liability towards at least two jurisdictions;

(b) perform first natural language processing on the information pertaining to the entity to generate a conceptual representation of the information pertaining to the entity, wherein the natural language processing is to be performed based upon at least one natural language in which the information is available;

(c) determine at least two tax jurisdictions towards which the entity has the tax liability, based upon the conceptual representation of the information pertaining to the entity, the at least two tax jurisdictions having different tax laws and regulations;

(d) access, from the database arrangement, knowledge-based information and regulation-based information pertaining to tax for each of the at least two tax jurisdictions, wherein the knowledge-based information comprises tax-related questionnaires pertaining to the entity received from the mobile client computing device, tax related advisory articles, tax reports, and historical tax reports of other entities, wherein the regulation-based information comprises tax-related cases, tax legislation, and tax regulations pertaining to the at least two tax jurisdictions;

(e) perform second natural language processing on the knowledge-based information and the regulation-based information to analyze the information and to generate a conceptual representation of the knowledge-based information and the regulation-based information for each of the at least two tax jurisdictions; and (f) analyse the conceptual representation of the information pertaining to the entity, based upon the conceptual representation of the knowledge-based information and the regulation-based information for the at least two tax jurisdictions, to determine the tax liability of the entity towards each of the at least two tax jurisdictions, wherein the system comprises a taxation module for determining the tax liability of the entity toward each of the at least two tax jurisdictions in a fully automated manner, wherein the taxation module is coupled in electronic communication with the server arrangement for performing tax liability computations, wherein the taxation module is implemented by employing customized processing hardware including a configuration of field-programmable gate arrays and reduced instruction set computers, wherein the reduced instruction set computers comprise a plurality of layers of clusters of variable state machines, wherein the layers are disposed in a hierarchical manner, wherein each of the variable state machines generates outputs in an adaptable manner between the hierarchical layers, wherein the variable state machines are reconfigured in response to a structure of the information pertaining to the entity received which is to be processed, wherein the one or more tax liability computations are allocated to a given one of the reduced instruction set computers, wherein correlations are performed by way of information exchange between the plurality of the reduced instruction set computers, and wherein the customized processing hardware further comprises automatically redeploying the plurality of data memory units of the database arrangement in operation so that less frequently accessed data processed by the customized processing hardware is stored in a relatively slower data memory unit and more frequently accessed data is stored in a relatively faster data memory unit.

2. A system of claim 1, wherein the server arrangement is configured to collect knowledge-based information and regulation-based information pertaining to tax for a plurality of tax jurisdictions, and to store the knowledge-based information and the regulation-based information pertaining to tax for the plurality of tax jurisdictions at the database arrangement.

3. A system of claim 2, wherein the knowledge-based information for a given tax jurisdiction is based upon tax data specific to the given tax jurisdiction, the tax data specific to the given tax jurisdiction comprising: historical tax reports of different entities in the given tax jurisdiction, tax reports by expert professionals for the given tax jurisdiction, tax-related advisory articles by expert professionals for the given tax jurisdiction, questionnaires filled by expert professionals for the given tax jurisdiction.

4. A system of claim 3, wherein, when collecting the knowledge-based information for the given tax jurisdiction, the server arrangement is configured to:

perform natural language processing on the tax data specific to the given tax jurisdiction and generate a conceptual representation of the tax data, wherein the natural language processing is to be performed based upon at least one natural language in which the tax data is available; and integrate the conceptual representation of the tax data into a conceptual representation of the knowledge-based information for the given tax jurisdiction.

5. A system of any of claims 2 to 4, wherein the regulation-based information for a given tax jurisdiction is based upon regulation data specific to the given tax jurisdiction, the regulation data specific to the given tax jurisdiction comprising at least one of: tax regulations imposed in the given tax jurisdiction, tax legislation in the given tax jurisdiction, details of tax-related cases decided by a court or any other competent authority in the given tax jurisdiction.

6. A system of claim 5, wherein, when collecting the regulation-based information for the given tax jurisdiction, the server arrangement is configured to:

perform natural language processing on the regulation data specific to the given tax jurisdiction and generate a conceptual representation of the regulation data, wherein the natural language processing is to be performed based upon at least one natural language in which the regulation data is available; and integrate the conceptual representation of the regulation data into a conceptual representation of the regulation-based information for the given tax jurisdiction.

7. A system of claim 1, wherein the server arrangement is configured to provide the entity or a representative of the entity with a questionnaire to clarify any inconsistencies identified during or after the analysis of the conceptual representation of the information pertaining to the entity at (f).

8. A system of claim 7, wherein the entity is an individual.

9. A system of claim 7, wherein the entity is a company.

10. A system of claim 9, wherein the server arrangement is configured to create a tax report of the entity for at least one of the at least two tax jurisdictions.

11. A system of claim 10, wherein the server arrangement is configured to enable the entity to pay tax to at least two tax authorities of the at least two tax jurisdictions, wherein an amount of the tax to be paid by the entity is based upon the determined tax liability of the entity towards the at least two tax jurisdictions.

12. A method of determining a tax liability of an entity, the method comprising using a computer system comprising a server arrangement and a database arrangement coupled in electronic communication with the server arrangement, wherein the server arrangement comprises a computing device in communication with a plurality of mobile client computing devices associated with the entity, each of the mobile client computing devices having an interface for user entry of information pertaining to the entity, wherein the database arrangement comprises a plurality of memory units of mutually different access speeds, wherein the method comprises using the computer system for:

(a) receiving, from at least one of the mobile client computing devices, a substantially large amount of information pertaining to the entity, wherein the entity has tax liability towards at least two jurisdictions;

(b) performing first natural language processing on the information pertaining to the entity to generate a conceptual representation of the information pertaining to the entity, wherein the natural language processing is to be performed based upon at least one natural language in which the information is available;

(c) determining at least two tax jurisdictions towards which the entity has the tax liability, based upon the conceptual representation of the information pertaining to the entity, the at least two tax jurisdictions having different tax laws and regulations;

(d) accessing, from the database arrangement, knowledge-based information and regulation-based information pertaining to tax for each of the at least two tax jurisdictions, wherein the knowledge-based information comprises tax-related questionnaires pertaining to the entity received from the mobile client computing device, tax related advisory articles, tax reports, and historical tax reports of other entities, wherein the regulation-based information comprises tax-related cases, tax legislation, and tax regulations pertaining to the at least two tax jurisdictions;

(e) performing second natural language processing on the knowledge-based information and the regulation-based information to analyze the information and to generate a conceptual representation of the knowledge-based information and the regulation-based information for each of the at least two tax jurisdictions; and (f) analysing the conceptual representation of the information pertaining to the entity, based upon the conceptual representation of the knowledge-based information and the regulation-based information for the at least two tax jurisdictions, to determine the tax liability of the entity towards each of the at least two tax jurisdictions, wherein the method comprises a taxation module for determining the tax liability of the entity toward each of the at least two tax jurisdictions in a fully automated manner, wherein the taxation module is coupled in electronic communication with the server arrangement for performing tax liability computations, wherein the taxation module is implemented by employing customized processing hardware including a configuration of field-programmable gate arrays and reduced instruction set computers, wherein the reduced instruction set computers comprise a plurality of layers of clusters of variable state machines, wherein the layers are disposed in a hierarchical manner, wherein each of the variable state machines generates outputs in an adaptable manner between the hierarchical layers, wherein the variable state machines are reconfigured in response to a structure of the information pertaining to the entity received which is to be processed, wherein the one or more tax liability computations are allocated to a given one of the reduced instruction set computers, wherein correlations are performed by way of information exchange between the plurality of the reduced instruction set computers, and wherein the customized processing hardware further comprises automatically redeploying the plurality of data memory units of the database arrangement in operation so that less frequently accessed data processed by the customized processing hardware is stored in a relatively slower data memory unit and more frequently accessed data is stored in a relatively faster data memory unit.

13. A method of claim 12, further comprising collecting knowledge-based information and regulation-based information pertaining to tax for a plurality of tax jurisdictions, and storing the knowledge-based information and/or the regulation-based information pertaining to tax for the plurality of tax jurisdictions at the database arrangement.

14. A method of claim 13, wherein the knowledge-based information for a given tax jurisdiction is based upon tax data specific to the given tax jurisdiction, the tax data specific to the given tax jurisdiction comprising: historical tax reports of different entities in the given tax jurisdiction, tax reports by expert professionals for the given tax jurisdiction, tax-related advisory articles by expert professionals for the given tax jurisdiction, questionnaires filled by expert professionals for the given tax jurisdiction.

15. A method of claim 14, wherein the step of collecting the knowledge-based information for the given tax jurisdiction comprises:

performing natural language processing on the tax data specific to the given tax jurisdiction and generating a conceptual representation of the tax data, the natural language processing being performed based upon at least one natural language in which the tax data is available; and integrating the conceptual representation of the tax data into a conceptual representation of the knowledge-based information for the given tax jurisdiction.

16. A method of any of claims 13 to 15, wherein the regulation-based information for a given tax jurisdiction is based upon regulation data specific to the given tax jurisdiction, the regulation data specific to the given tax jurisdiction comprising at least one of: tax regulations imposed in the given tax jurisdiction, tax legislation in the given tax jurisdiction, details of tax-related cases decided by a court or any other competent authority in the given tax jurisdiction.

17. A method of claim 16, wherein the step of collecting the regulation-based information for the given tax jurisdiction comprises:

performing natural language processing on the regulation data specific to the given tax jurisdiction and generating a conceptual representation of the regulation data, the natural language processing being performed based upon at least one natural language in which the regulation data is available; and integrating the conceptual representation of the regulation data into a conceptual representation of the regulation-based information for the given tax jurisdiction.

18. A method of claim 12, further comprising providing the entity or a representative of the entity with a questionnaire to clarify any inconsistencies identified during or after the analysis of the conceptual representation of the information pertaining to the entity at the step (f).

19. A method of claim 18, wherein the entity is an individual.

20. A method of claim 18, wherein the entity is a company.

21. A method of claim 20, further comprising creating a tax report of the entity for at least one of the at least two tax jurisdictions.

22. A method of claim 21, further comprising enabling the entity to pay tax to at least two tax authorities of the at least two tax jurisdictions, wherein an amount of the tax to be paid by the entity is based upon the determined tax liability of the entity towards the at least two tax jurisdictions.

23. A computer program product for determining a tax liability of an entity, the computer program product comprising a non-transitory machine-readable data storage medium having stored thereon program instructions that, when accessed by a processing device, cause the processing device to perform the following operations, wherein the processing device comprises a server arrangement and a database arrangement coupled in electronic communication with the server arrangement, wherein the server arrangement comprises a computing device in communication with a plurality of mobile client computing devices associated with the entity, each of the mobile client computing devices having an interface for user entry of information pertaining to the entity, wherein the database arrangement comprises a plurality of memory units of mutually different access speeds:

(a) receive, from at least one of the mobile client computing devices, a substantially large amount of information pertaining to the entity, wherein the entity has tax liability towards at least two jurisdictions;

(b) perform first natural language processing on the information pertaining to the entity to generate a conceptual representation of the information pertaining to the entity, wherein the natural language processing is to be performed based upon at least one natural language in which the information is available;

(c) determine at least two tax jurisdictions towards which the entity has the tax liability, based upon the conceptual representation of the information pertaining to the entity, the at least two tax jurisdictions having different tax laws and regulations;

(d) access, from the database arrangement, knowledge-based information and regulation-based information pertaining to tax for each of the at least two jurisdictions, wherein the knowledge-based information comprises tax-related questionnaires pertaining to the entity received from the mobile client computing device, tax related advisory articles, tax reports, and historical tax reports of other entities, wherein the regulation-based information comprises tax-related cases, tax legislation, and tax regulations pertaining to the at least two tax jurisdictions;

(e) perform second natural language processing on the knowledge-based information and the regulation-based information to analyze the information and to generate a conceptual representation of the knowledge-based information and the regulation-based information for each of the at least two tax jurisdictions; and (f) analyse the conceptual representation of the information pertaining to the entity, based upon the conceptual representation of the knowledge-based information and the regulation-based information for the at least two tax jurisdictions, to determine the tax liability of the entity towards each of the at least two tax jurisdictions, wherein the computer program product comprises a taxation module for determining the tax liability of the entity toward each of the at least two tax jurisdictions in a fully automated manner, wherein the taxation module is coupled in electronic communication with the processing device for performing tax liability computations, wherein the taxation module is implemented by employing customized processing hardware including a configuration of field-programmable gate arrays and reduced instruction set computers, wherein the reduced instruction set computers comprise a plurality of layers of clusters of variable state machines, wherein the layers are disposed in a hierarchical manner, wherein each of the variable state machines generates outputs in an adaptable manner between the hierarchical layers, wherein the variable state machines are reconfigured in response to a structure of the information pertaining to the entity received which is to be processed, wherein the one or more tax liability computations are allocated to a given one of the reduced instruction set computers, wherein correlations are performed by way of information exchange between the plurality of the reduced instruction set computers, and wherein the customized processing hardware further comprises automatically redeploying the plurality of data memory units of the database arrangement in operation so that less frequently accessed data processed by the customized processing hardware is stored in a relatively slower data memory unit and more frequently accessed data is stored in a relatively faster data memory unit.

* * * * *